US012192405B2

(12) United States Patent (10) Patent No.: US 12,192,405 B2
Mundie et al. (45) Date of Patent: Jan. 7, 2025

(54) AUTOMATED INTERACTIVE VOICE RESPONSE INTERACTION USING VOICE PROMPT CLASSIFICATION MACHINE LEARNING FRAMEWORKS

(71) Applicant: Optum, Inc., Minnetonka, MN (US)

(72) Inventors: Brent A. Mundie, Nolensville, TN (US); Natraj Patil, Brentwood, TN (US); Roger D. Dowell, Irvington, KY (US); Joseph M. Scavone, Franklin, TN (US); Barrett D. Santi, Nashville, TN (US)

(73) Assignee: Optum, Inc., Minnetonka, MN (US)

( * ) Notice: Subject to any disclaimer, the term of this patent is extended or adjusted under 35 U.S.C. 154(b) by 222 days.

(21) Appl. No.: 17/807,291

(22) Filed: Jun. 16, 2022

(65) Prior Publication Data

US 2023/0412731 A1    Dec. 21, 2023

(51) Int. Cl.
  *H04M 3/493* (2006.01)
  *H04M 3/51* (2006.01)
(52) U.S. Cl.
  CPC ......... *H04M 3/493* (2013.01); *H04M 3/5166* (2013.01); *H04M 3/5183* (2013.01); *H04M 2203/355* (2013.01)
(58) Field of Classification Search
  CPC .. H04M 3/493; H04M 3/5166; H04M 3/5183; H04M 2203/355
  See application file for complete search history.

(56) References Cited

U.S. PATENT DOCUMENTS

| | | | | |
|---|---|---|---|---|
| 6,456,699 | B1* | 9/2002 | Burg | H04M 3/493 379/265.09 |
| 8,379,830 | B1* | 2/2013 | Naik | H04M 3/493 379/265.03 |
| 8,661,112 | B2* | 2/2014 | Creamer | H04M 3/493 379/88.16 |
| 8,867,708 | B1* | 10/2014 | Lavian | H04M 3/493 710/63 |
| 9,420,097 | B2* | 8/2016 | Perotti | H04M 3/493 |
| 9,900,433 | B1* | 2/2018 | Helbert | H04M 3/493 |
| 10,313,518 | B1* | 6/2019 | Juvet | H04M 3/53366 |
| 10,659,585 | B1* | 5/2020 | Graham | H04M 3/493 |
| 10,972,607 | B1* | 4/2021 | Graham | G10L 15/22 |
| 11,055,119 | B1* | 7/2021 | Silverstein | G06N 3/08 |
| 11,343,378 | B1* | 5/2022 | Sharma | G10L 15/22 |
| 11,606,463 | B1* | 3/2023 | Yeracaris | H04M 3/5232 |
| 2010/0278316 | A1* | 11/2010 | Beauregard | H04M 3/42068 379/88.01 |

(Continued)

*Primary Examiner* — Akelaw Teshale
(74) *Attorney, Agent, or Firm* — Alston & Bird LLP

(57) ABSTRACT

Various embodiments of the present invention provide methods, apparatuses, systems, computing devices, computing entities, and/or the like for facilitating efficient and effective automated interactions with IVR systems. For example, various embodiments of the present invention provide methods, apparatuses, systems, computing devices, computing entities, and/or the like for facilitating efficient and effective automated interactions with IVR systems using voice prompt classification machine learning models, IVR navigation tree data objects, resource allocation shares for resource utilization categories, and automated IVR session queues for resource utilization categories.

20 Claims, 9 Drawing Sheets

(56) References Cited

U.S. PATENT DOCUMENTS

| | | | |
|---|---|---|---|
| 2013/0077767 A1* | 3/2013 | Suendermann | H04M 3/4936 379/88.01 |
| 2015/0010134 A1* | 1/2015 | Erel | H04M 3/4936 379/88.01 |
| 2017/0124594 A1* | 5/2017 | Naiga | G06Q 30/0267 |
| 2018/0338041 A1* | 11/2018 | McGann | G06F 17/18 |
| 2020/0065334 A1* | 2/2020 | Rodriguez | G06F 40/35 |
| 2020/0310598 A1* | 10/2020 | Colevas | G06N 20/00 |
| 2020/0327394 A1* | 10/2020 | Hultgren | G06N 3/044 |
| 2021/0250438 A1* | 8/2021 | Lu | G06F 3/0482 |
| 2021/0281682 A1* | 9/2021 | Agarwal | G06F 3/017 |
| 2021/0409542 A1* | 12/2021 | Chavez | H04L 51/02 |
| 2022/0109753 A1* | 4/2022 | Baror | H04M 3/42204 |
| 2022/0148568 A1* | 5/2022 | Kulkarni | G10L 15/22 |
| 2022/0172077 A1* | 6/2022 | Chikoti | H04L 41/16 |
| 2022/0360668 A1* | 11/2022 | Brink | G10L 15/22 |
| 2023/0199116 A1* | 6/2023 | Koneru | G10L 15/063 379/88.01 |
| 2023/0216956 A1* | 7/2023 | Nesargi | H04L 63/08 379/265.09 |
| 2023/0247140 A1* | 8/2023 | Li | H04M 3/5233 379/266.01 |

* cited by examiner

COB Eligibility Results 900

Samantha Smith
Member ID: 22353255
1395 ABC Rd NE Bldg A4th
Atlanta, GA 30322

Status: Dual Enrollment Confirmed

Request Adjustment

Mark Mead
5445 DEF Mark Rd Ste 270
Atlanta, GA 30342

Status: Inquiry Unsuccessful

Request Investigation

AUTOMATED INTERACTIVE VOICE RESPONSE INTERACTION USING VOICE PROMPT CLASSIFICATION MACHINE LEARNING FRAMEWORKS

BACKGROUND

Various embodiments of the present invention address technical challenges related to performing efficient and effective automated interactions with Interactive Voice Response (IVR) systems.

BRIEF SUMMARY

In general, various embodiments of the present invention provide methods, apparatuses, systems, computing devices, computing entities, and/or the like for facilitating efficient and effective automated interactions with IVR systems. For example, various embodiments of the present invention provide methods, apparatuses, systems, computing devices, computing entities, and/or the like for facilitating efficient and effective automated interactions with IVR systems using voice prompt classification machine learning models, IVR navigation tree data objects, resource allocation shares for resource utilization categories, and automated IVR session queues for resource utilization categories.

In accordance with one aspect, a method includes: identifying an IVR navigation tree data object associated with the automated IVR session, where the IVR navigation tree data object defines: (i) a plurality of IVR state nodes, and (ii) for each non-leaf IVR state node, a downstream state subset of the group of IVR state nodes that comprises one or more downstream IVR state nodes for the non-leaf IVR state node; and performing a required number of IVR navigation routine iterations of an iterative IVR navigation routine, wherein performing a current IVR navigation routine iteration comprises: (i) identifying a current IVR state node for the current IVR navigation routine iteration; (ii) causing the automated IVR interaction system to transmit response data based at least in part on the current IVR state node; (iii) in response to the response data, identifying a current IVR voice prompt for the current IVR navigation routine iteration; (iv) determining, using a voice prompt classification machine learning framework and based at least in part on the current IVR voice prompt for the current IVR navigation routine iteration, an iterative IVR prompt class for the current IVR navigation routine iteration that is selected from a plurality of candidate iterative IVR prompt classes for the current IVR state node for the current IVR navigation routine iteration, wherein the plurality of candidate iterative IVR prompt classes comprise, for each downstream IVR state node associated with the current IVR state node, a transitional iterative IVR prompt class; and (v) performing an iterative IVR navigation operation for the current IVR navigation routine iteration based at least in part on the iterative IVR prompt class for the current IVR navigation routine iteration.

In accordance with another aspect, an apparatus comprising at least one processor and at least one memory including program code, the at least one memory and the program code configured to, with the processor, cause the apparatus to at least: identify an IVR navigation tree data object associated with the automated IVR session, where the IVR navigation tree data object defines: (i) a plurality of IVR state nodes, and (ii) for each non-leaf IVR state node, a downstream state subset of the group of IVR state nodes that comprises one or more downstream IVR state nodes for the non-leaf IVR state node; and perform a required number of IVR navigation routine iterations of an iterative IVR navigation routine, wherein performing a current IVR navigation routine iteration comprises: (i) identifying a current IVR state node for the current IVR navigation routine iteration; (ii) causing the automated IVR interaction system to transmit response data based at least in part on the current IVR state node; (iii) in response to the response data, identifying a current IVR voice prompt for the current IVR navigation routine iteration; (iv) determining, using a voice prompt classification machine learning framework and based at least in part on the current IVR voice prompt for the current IVR navigation routine iteration, an iterative IVR prompt class for the current IVR navigation routine iteration that is selected from a plurality of candidate iterative IVR prompt classes for the current IVR state node for the current IVR navigation routine iteration, wherein the plurality of candidate iterative IVR prompt classes comprise, for each downstream IVR state node associated with the current IVR state node, a transitional iterative IVR prompt class; and (v) performing an iterative IVR navigation operation for the current IVR navigation routine iteration based at least in part on the iterative IVR prompt class for the current IVR navigation routine iteration.

In accordance with yet another aspect, a computer program product computer program comprising at least one non-transitory computer-readable storage medium having computer-readable program code portions stored therein, the computer-readable program code portions configured to: identify an IVR navigation tree data object associated with the automated IVR session, where the IVR navigation tree data object defines: (i) a plurality of IVR state nodes, and (ii) for each non-leaf IVR state node, a downstream state subset of the group of IVR state nodes that comprises one or more downstream IVR state nodes for the non-leaf IVR state node; and perform a required number of IVR navigation routine iterations of an iterative IVR navigation routine, wherein performing a current IVR navigation routine iteration comprises: (i) identifying a current IVR state node for the current IVR navigation routine iteration; (ii) causing the automated IVR interaction system to transmit response data based at least in part on the current IVR state node; (iii) in response to the response data, identifying a current IVR voice prompt for the current IVR navigation routine iteration; (iv) determining, using a voice prompt classification machine learning framework and based at least in part on the current IVR voice prompt for the current IVR navigation routine iteration, an iterative IVR prompt class for the current IVR navigation routine iteration that is selected from a plurality of candidate iterative IVR prompt classes for the current IVR state node for the current IVR navigation routine iteration, wherein the plurality of candidate iterative IVR prompt classes comprise, for each downstream IVR state node associated with the current IVR state node, a transitional iterative IVR prompt class; and (v) performing an iterative IVR navigation operation for the current IVR navigation routine iteration based at least in part on the iterative IVR prompt class for the current IVR navigation routine iteration.

BRIEF DESCRIPTION OF THE DRAWINGS

Figure 1:
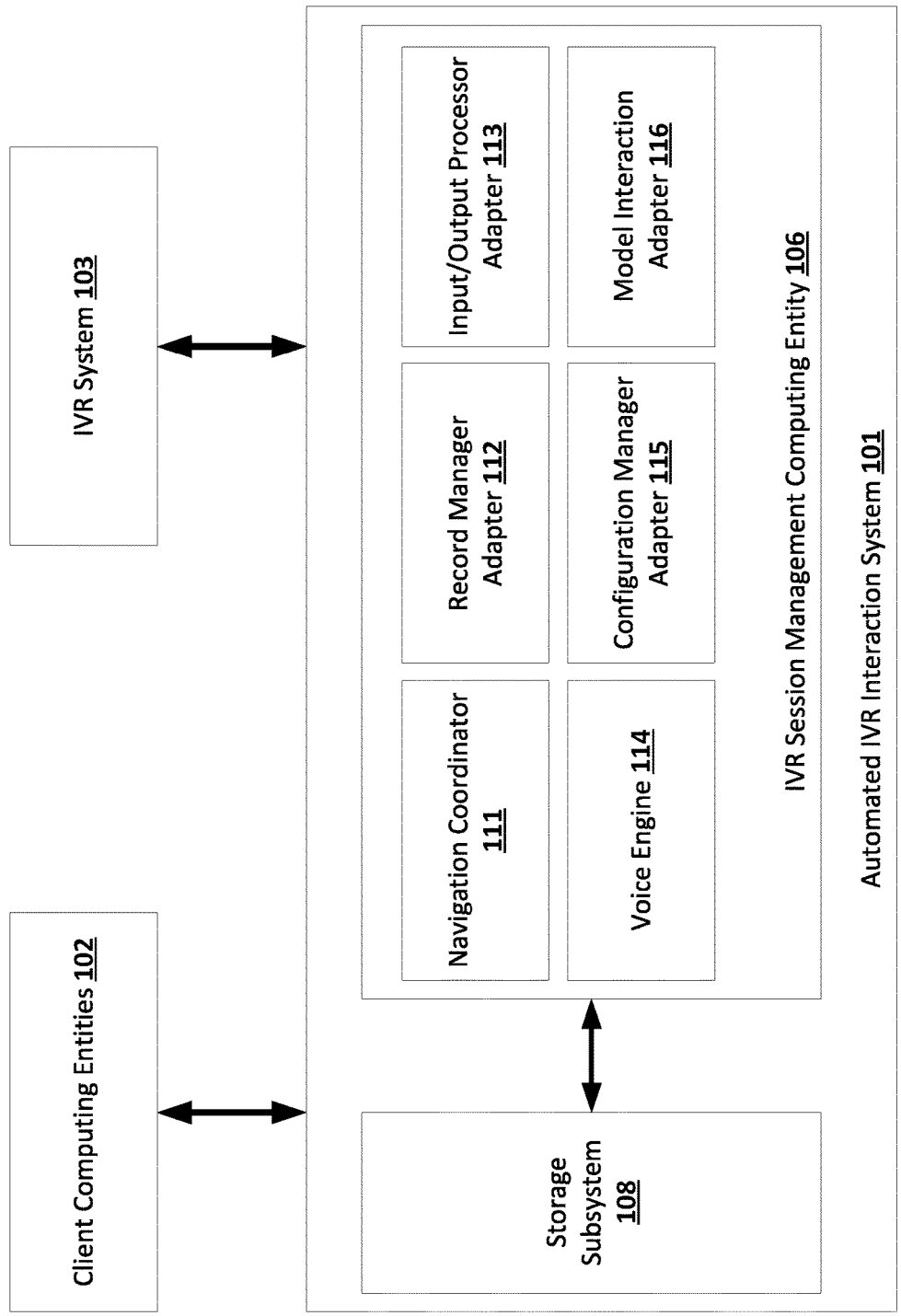

Having thus described the invention in general terms, reference will now be made to the accompanying drawings, which are not necessarily drawn to scale, and wherein:

FIG. 1 provides an exemplary overview of a system that can be used to practice embodiments of the present invention.

Figure 2:
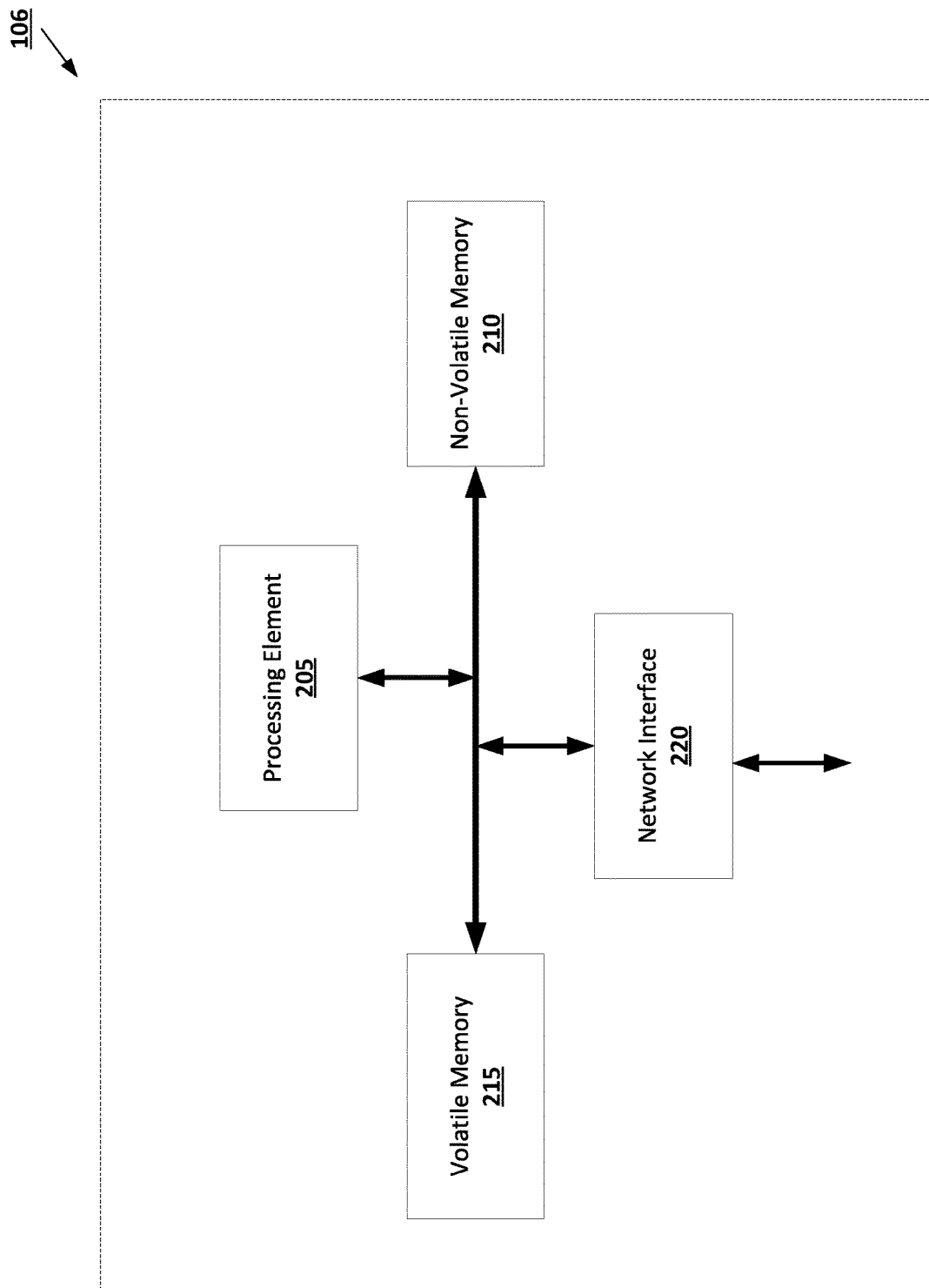

FIG. 2 provides an example IVR session management computing entity in accordance with some embodiments discussed herein.

Figure 3:
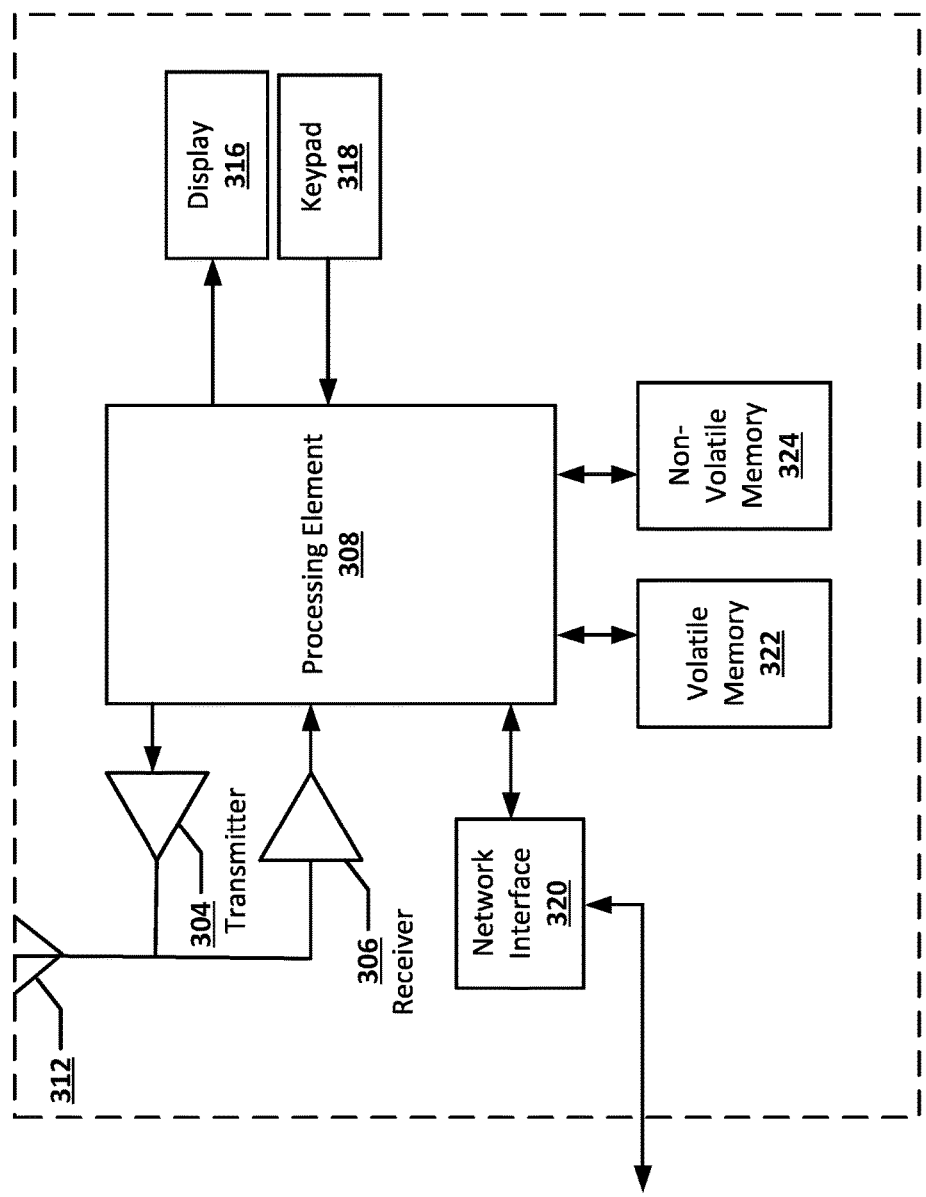

FIG. 3 provides an example client computing entity in accordance with some embodiments discussed herein.

Figure 4:
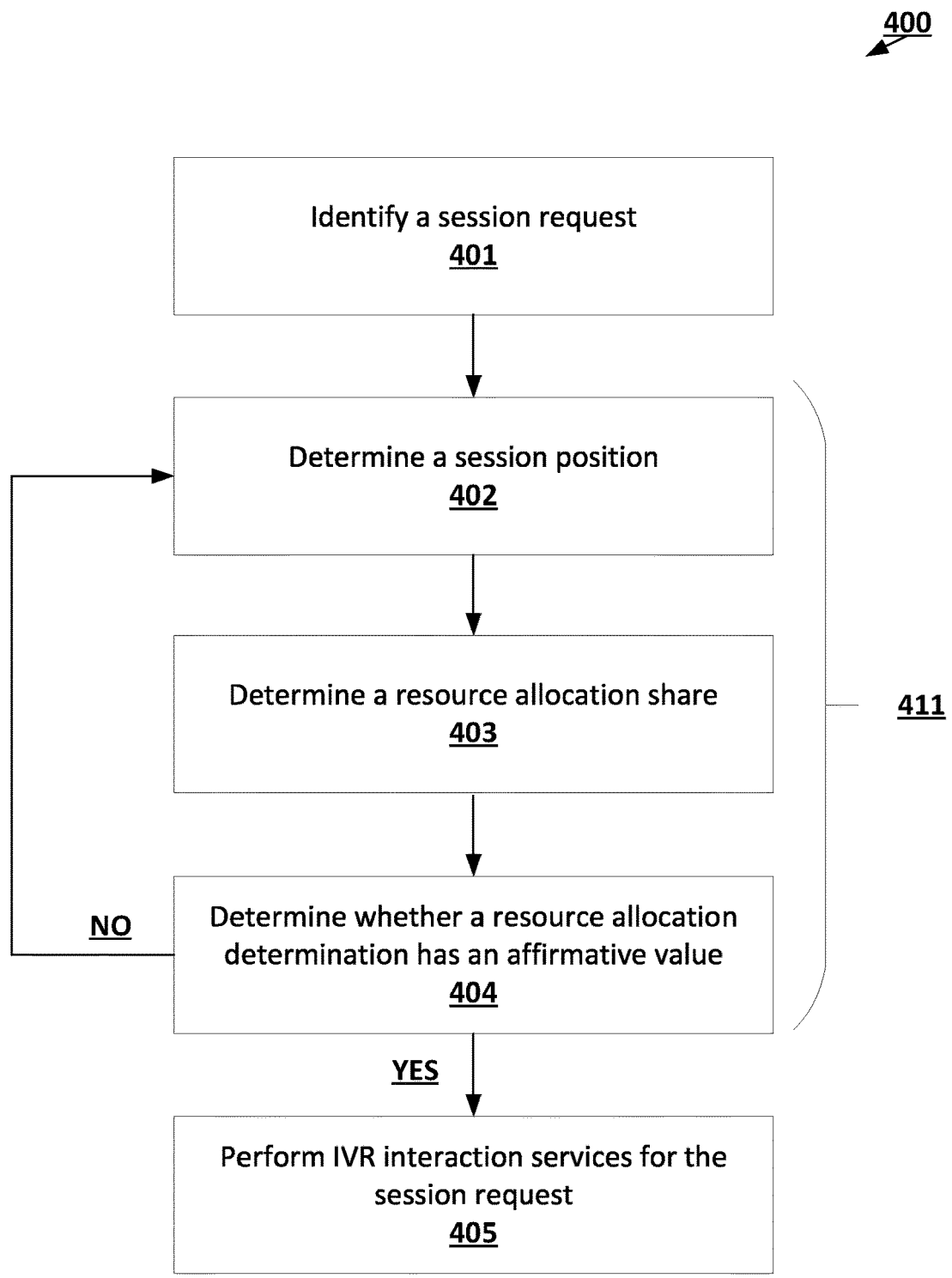

FIG. 4 is a flowchart diagram of an example process for initiating an automated IVR session in accordance with some embodiments discussed herein.

Figure 5:
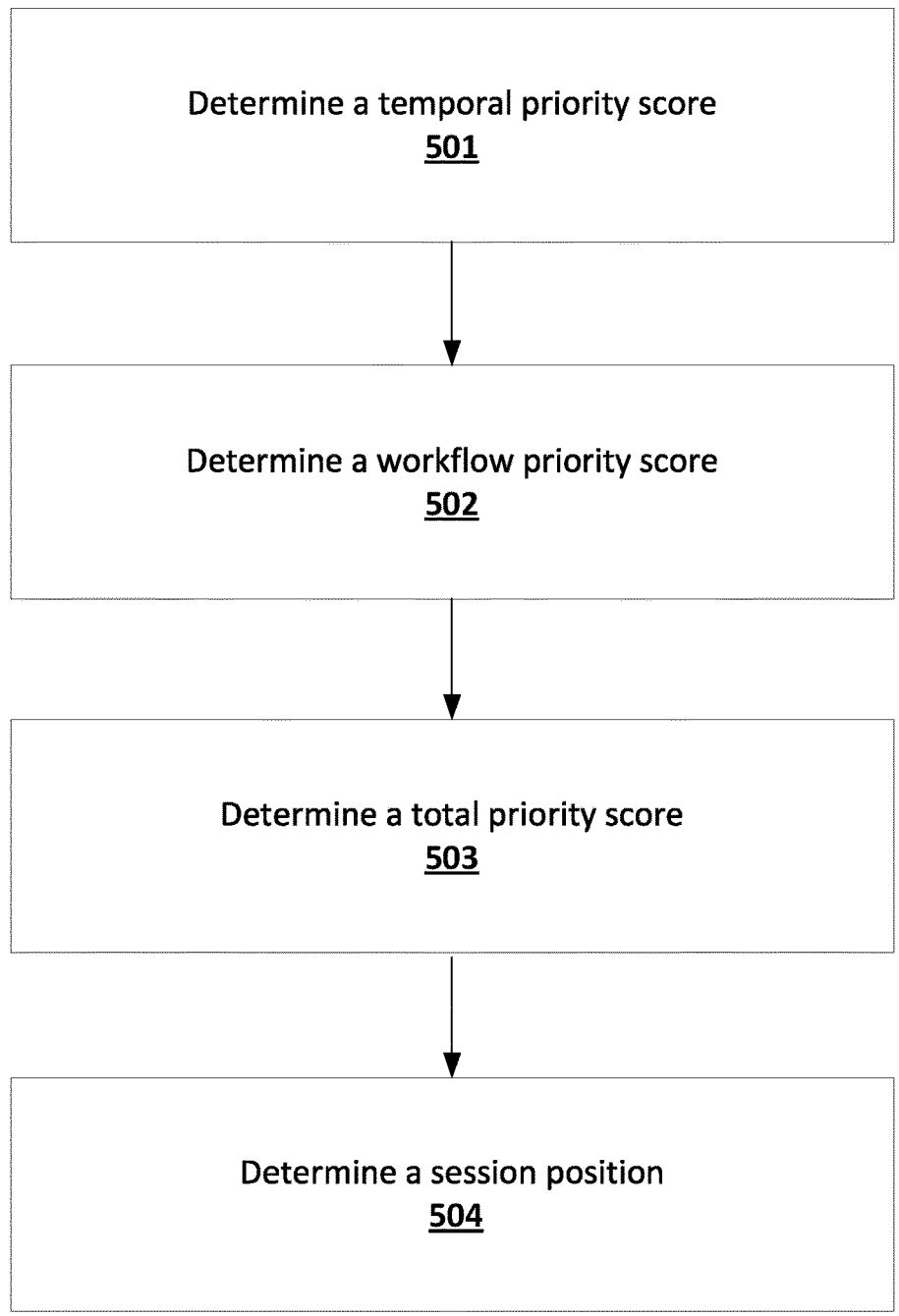

FIG. 5 is a flowchart diagram of an example process for determining the session position for a particular session request that is associated with a particular resource utilization category in accordance with some embodiments discussed herein.

Figure 6:
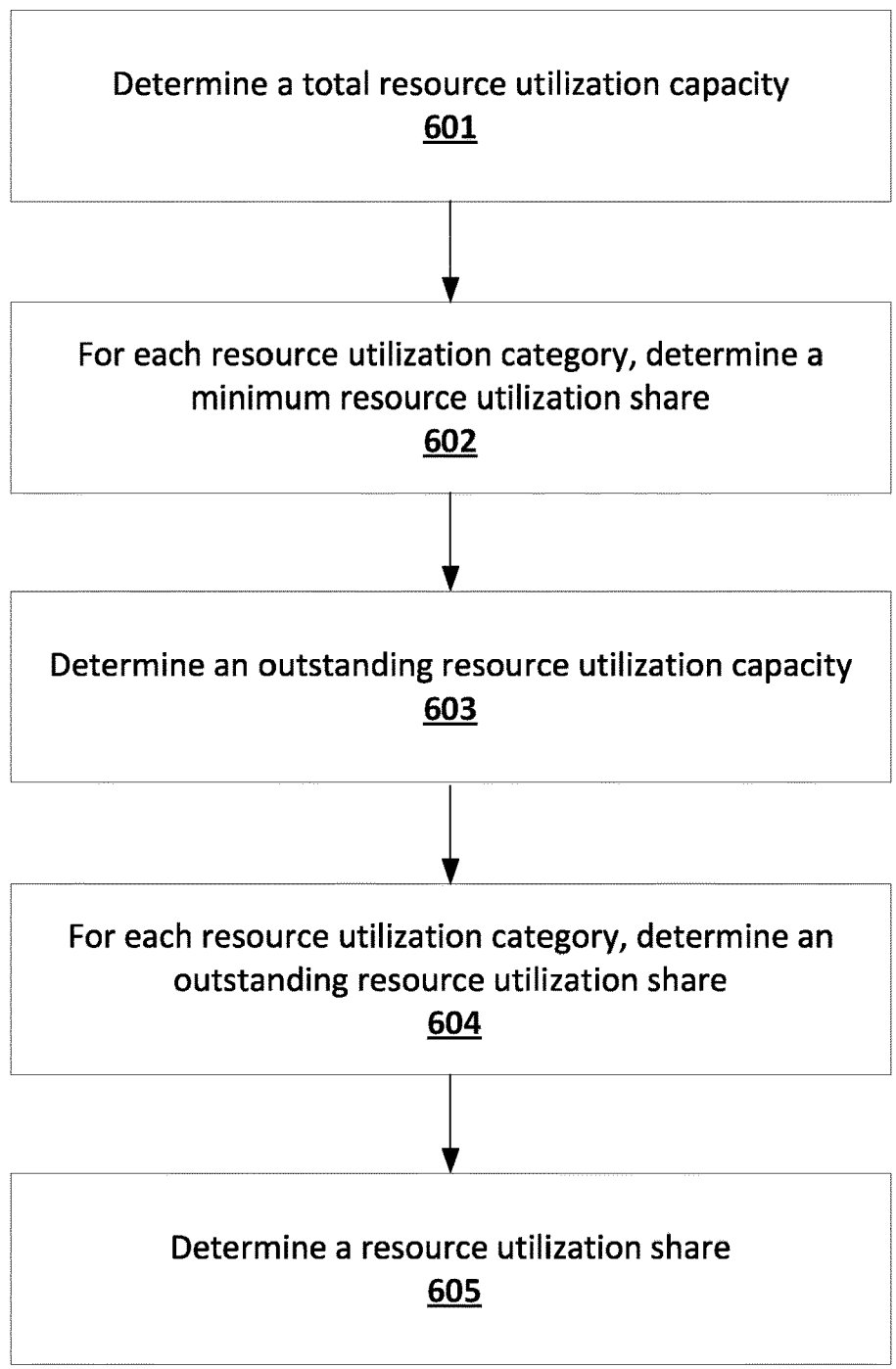

FIG. 6 is a flowchart diagram of an example process for determining n resource allocation shares for n resource utilization categories at a particular determination time in accordance with some embodiments discussed herein.

Figure 7:
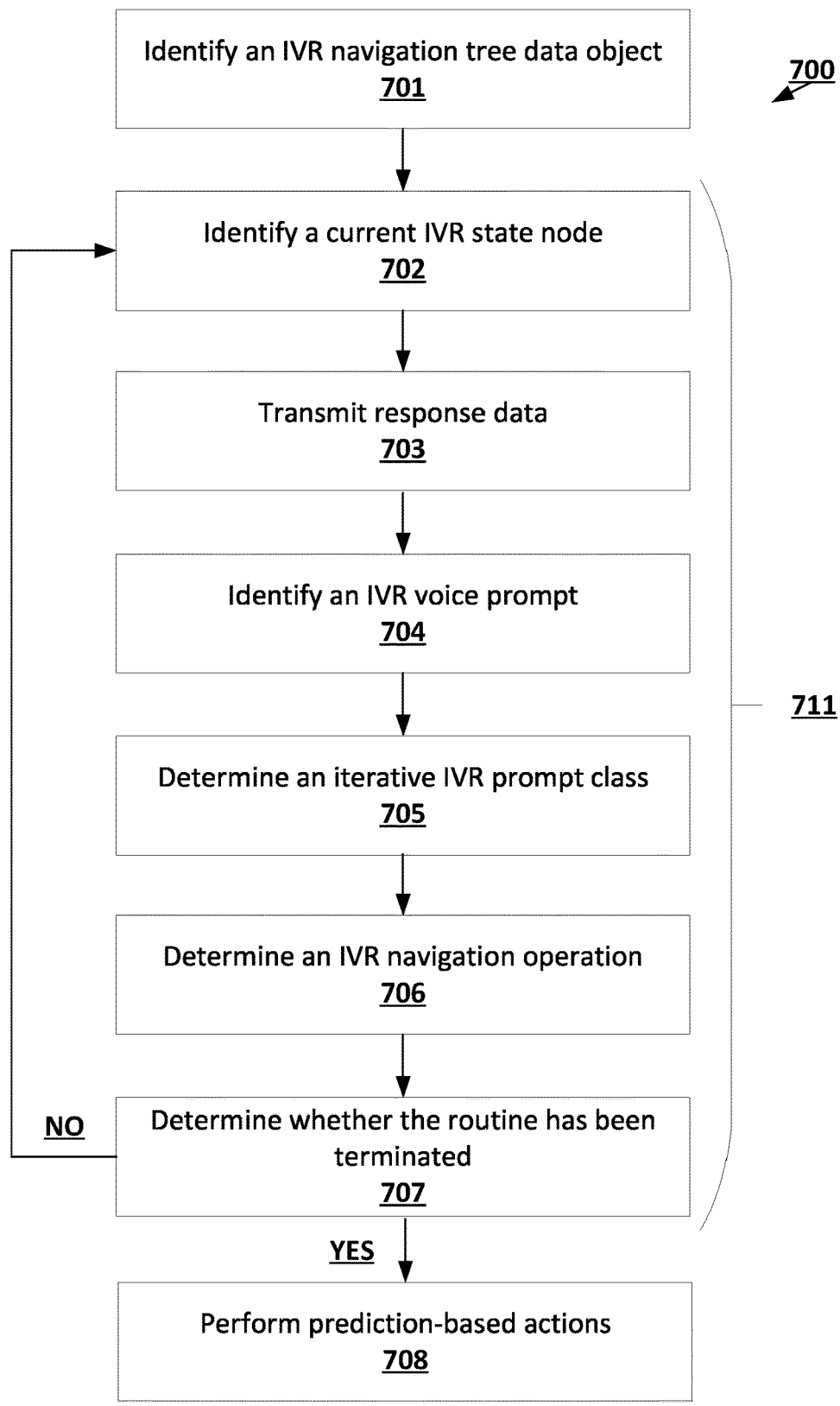

FIG. 7 is a flowchart diagram of an example process for navigating an automated IVR session in accordance with some embodiments discussed herein.

Figure 8:
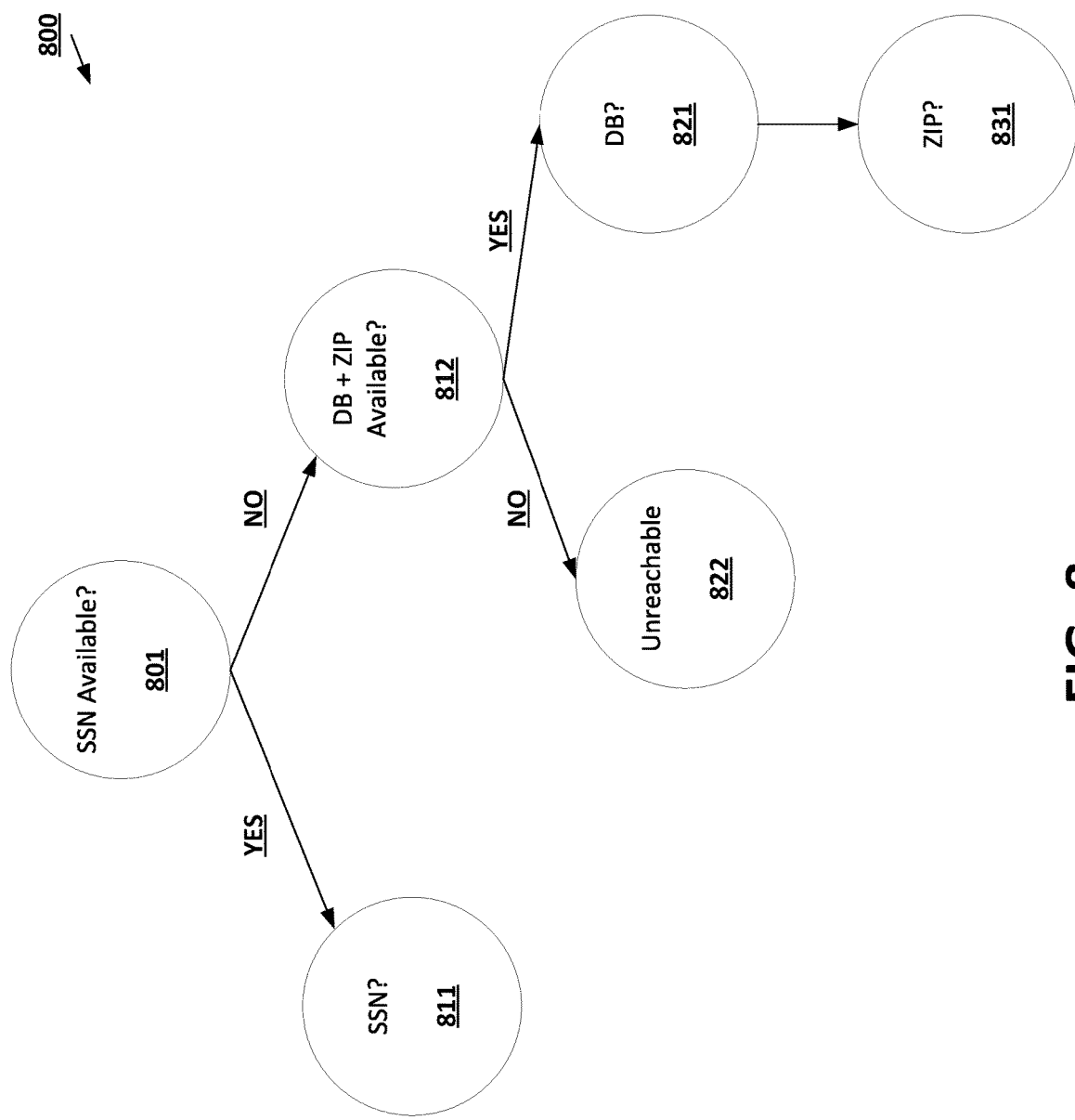

FIG. 8 provides an operational example of an IVR navigation tree data object in accordance with some embodiments discussed herein.

Figure 9:
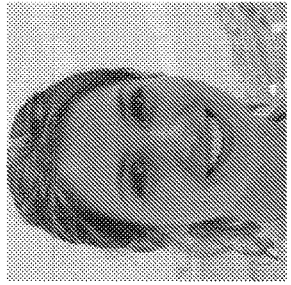
Figure 9:
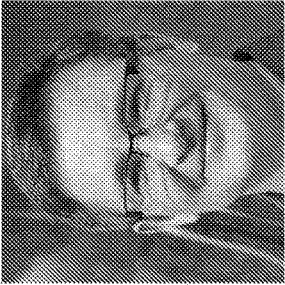

FIG. 9 provides an operational example of an IVR interaction output display user interface in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Advantages

Various embodiments of the present invention are configured to address technical challenges associated with efficiently and effectively facilitating real-time automated interactions with an IVR system by using voice prompt classification machine learning frameworks and IVR navigation tree data objects. As described below, by utilizing the noted techniques, various embodiment of the present invention reduce the number of predictive inferences that need to be performed during each current IVR navigation routine to O(n) predictive inferences, where n is the number of downstream IVR state nodes of a current IVR state node that is associated with the current IVR navigation routine. For example, in some embodiments, n+2 predictive inferences will be performed, where n is the number of downstream IVR state nodes of a current IVR state node that is associated with the current IVR navigation routine, and where n predictive inferences are performed to determine classification scores for the n downstream IVR state nodes, one predictive inference is performed to determine whether to terminate the automated IVR session in response to a human agent transition IVR voice prompt, and one predictive inference is performed to determine whether to return to a root IVR state node if the preceding predictive inferences are not deemed sufficiently reliable. Accordingly, by reducing the number of predictive inferences that need to be performed during each current IVR navigation routine to O(n) predictive inferences, where n is the number of downstream IVR state nodes of a current IVR state node that is associated with the current IVR navigation routine, various embodiments of the present invention reduce the number of computational operations that need to be performed to efficiently and effectively facilitate real-time automated interactions with an IVR system. In doing so, various embodiments of the present invention improve computational efficiency of real-time automated IVR interaction solutions.

Various embodiments of the present invention make important technical contributions to improving resource-usage efficiency of post-prediction systems by using IVR interaction outputs as prediction outputs to set the number of allowed computing entities used by the noted post-prediction systems. For example, in some embodiments, an IVR session management computing entity determines D investigation classifications for D target entities (e.g., members) based at least in part on the D hybrid reason code predictions for the D target entities. Then, the count of target entities that are associated with an affirmative investigation classification, along with a resource utilization ratio for each target entity, can be used to predict a predicted number of computing entities needed to perform post-prediction processing operations (e.g., automated investigation operations) with respect to the D target entities. For example, in some embodiments, the number of computing entities needed to perform post-prediction processing operations (e.g., automated investigation operations) with respect to D target entities can be determined based at least in part on the output of the equation: $R = \text{ceil}(\Sigma_k^{k=K} ur_k)$, where R is the predicted number of computing entities needed to perform post-prediction processing operations with respect to the D target entity, cello) is a ceiling function that returns the closest integer that is greater than or equal to the value provided as the input parameter of the ceiling function, k is an index variable that iterates over K target entities that are associated with affirmative investigative classifications, and $ur_k$ is the estimated resource utilization ratio for a kth target entity that may be determined based at least in part on a count of data fields associated with the kth target entity. In some embodiments, once R is generated, a predictive data analysis computing entity can use R to perform operational load balancing for a server system that is configured to perform post-prediction processing operations (e.g., automated investigation operations) with respect to the D target entities. This may be done by allocating computing entities to the post-prediction processing operations if the number of currently-allocated computing entities is below R, and deallocating currently-allocated computing entities if the number of currently-allocated computing entities is above R.

II. Definitions of Certain Terms

The term "automated IVR session" may refer to a data construct that describes communication data provided by an IVR system and an automated IVR interaction to each other in relation to a target entity (e.g., a target member) and during an interrupted interchange of data. In some embodiments, data provided by an IVR system during an automated IVR session include IVR voice prompts, while data provided automated IVR interaction include response data provided in response to received IVR voice prompts, where the response data may be entered using data describing keypad selection, voice data (e.g., synthetically-generated voice data that are generated using a text-to-speech model), and/or the like.

The term "resource utilization category" may refer to a data construct that describes a grouping of a subset of session requests received by an automated IVR interaction system, such that each session request received by the automated IVR interaction system may belong to one and only one resource utilization category. For example, in some embodiments, an IVR system may be configured to provide IVR interaction services (i.e., IVR session initiation services and IVR session navigation services) to n computing entities associated with n client identifiers. In some of the noted embodiments, n resource utilization categories may be defined, with each resource utilization category describing a designation attributed to session requests transmitted by client computing entities of a corresponding client computing entity of the n client computing entities. In some embodiments, each resource utilization category may be associated with a minimum resource utilization share, which may be used to determine a required share of computing resource units associated with a voice engine of an IVR session management computing entity that should at all times be allocated to performing IVR interaction operations corresponding to the session requests associated with the resource utilization category.

The term "triggering workflow" may refer to a data construct that describes a processing workflow performed by a request-transmitting client computing entity that has led to generation and transition of a session request by the noted client computing entity. In some embodiments, the automated IVR interaction system is configured to provide IVR interaction services (i.e., IVR session initiation services and IVR session navigation services) to n computing entities associated with n client identifiers. In some of the noted embodiments, each of the n computing entities is configured to perform operations that correspond to a set of processing workflows, where each processing workflow may include a sequence of workflow operations, and where some of the workflow operations may include transmitting session requests for automated IVR session to an automated IVR interaction system. Accordingly, each session request may be associated with a processing workflow that has triggered the transmission of the session request to the IVR system via causing performance of a workflow operation that has led to transmitting the session request. For example, in some embodiments, a processing workflow for determining a Coordination of Benefits (COB) determination for a senior member may require: (i) determining whether health insurance inventory data describes that the senior member has Medicare coverage, and (ii) in response to determining that the health insurance inventory data does not describe that the senior member has Medicare coverage, requesting an automated IVR session with the IVR system of the Centers for Medicare & Medicaid Services (CMS) to determine whether the senior member has Medicare coverage. In some embodiments, if the processing workflow is performed with respect to a particular senior member, and if a negative determination at operation (1) leads to transmitting a session request at operation (2), then the session request may describe an identifier of the noted processing workflow.

The term "automated IVR session queue" may refer to a data construct that describes an ordering scheme that assigns a discrete order designation value to each session request of a set of outstanding session requests associated with a corresponding resource utilization category. As described above, session requests identified (e.g., received) by an IVR session management computing entity may be mapped to a set of resource utilization categories in a one-to-many fashion, such that each session request is mapped to one resource utilization category, and each resource utilization category may be associated with one or more session requests. In some embodiments, the one or more session requests associated with a resource utilization category are ordered by an automated IVR session queue for the resource utilization category, where the automated IVR session queue for the resource utilization category describes a discrete session position for each session request associated with the resource utilization category. For example, if a resource utilization category is associated with session requests R1, R2, and R3, then an example automated IVR session queue for the resource utilization category may assign session request R2 to a first session position, session request R1 to a second session position, and session request R3 to a third session position.

The term "resource allocation share" may refer to a data construct that describes a number of session requests associated with a corresponding resource utilization category that can, at the particular determination time, use computing resource units associated with the voice engine of an IVR session management computing entity. For example, the IVR session management computing entity may determine that two session requests for a particular resource utilization category (e.g., a particular client computing entity) may be permitted to use computing resource units associated with the voice engine of the IVR session management computing entity. In this example, the resource allocation share for the particular resource utilization category may be two. In some embodiments, to determine the resource allocation shares for n resource utilization categories, the following operations are performed: (i) a total resource utilization capacity (referred to herein as 7) describing an estimated/preconfigured total number of session requests that may at a determination time use the computing resource units associated with the voice engine of the IVR session management computing entity is determined, (ii) for each resource utilization category of the n resource utilization categories, a minimum resource utilization share (referred to herein as $M_i$ for an ith resource utilization category) describing a minimum number of session requests of the resource utilization category that may at a determination time use the computing resource units associated with the voice engine of the IVR session management computing entity is determined, (iii) an outstanding resource utilization capacity (referred to herein as O, which may be determined using the operations of the equation $O=T-\Sigma_{i=1}^{n} M_i$) describing a number of session requests that may at a determination time use the computing resource units associated with the voice engine of the IVR session management computing entity independent of the minimum resource utilization shares determined at (ii) is determined, (iv) for each resource utilization category of the n resource utilization categories, an outstanding resource utilization share (referred to herein as $O_i$ for an ith resource utilization category) describing a share of the outstanding resource utilization capacity that is assigned to the resource utilization category is determined, and (iv) for each resource utilization category of the n resource utilization categories, the resource allocation share (referred to herein as $R_i$ for an ith resource utilization category) is determined by performing the operations of the equation $R_i = M_i + O_i$.

The term "total resource utilization capacity" may refer to a data construct that describes a total number of session requests that can use computing resources of the voice engine of an IVR session management computing entity at a particular determination time. For example, the total resource utilization capacity may describe that, at a corresponding determination time, ten session requests may use computing resources of the voice engine of the IVR session management computing entity. In some embodiments, the total resource utilization capacity is constant across time, such that a constant number of session requests may use computing resources of the voice engine of the IVR session management computing entity at any determination time. In some embodiments, the total resource utilization capacity for a particular determination time is determined based at least in part on a total number of session requests in the n automated IVR session queues for the n resource utilization categories at the particular determination time, the total number of computing resource units of the voice engine at the particular determination time, and/or the total number of triggering workflows associated with the total number of session requests in the n automated IVR session queues for the n resource utilization categories at the particular determination time.

The term "minimum resource utilization share" may refer to a data construct that describes a minimum number of session requests of the resource utilization category that may at a determination time use the computing resource units associated with the voice engine of an IVR session management computing entity. For example, the minimum resource utilization share for a particular resource utilization category may require that, at the particular determination time (e.g., at any determination time), at least two session requests of the resource utilization category may use the computing resource units associated with the voice engine of the IVR session management computing entity. In some embodiments, this minimum resource allocation may ensure that, at each time, a required share of the computing resources of the voice engine are reserved for each resource utilization category (e.g., for each client), to ensure that each client can at all times enjoy the IVR interaction services of the IVR session management computing entity without wait-times imposed by the multi-tenant/multi-client nature of the IVR interaction service provision architecture presented by some embodiments of the present invention.

The term "outstanding resource utilization capacity" may refer to a data construct that describes a number of session requests that may at a determination time use the computing resource units associated with the voice engine of an IVR session management computing entity independent of the minimum resource utilization shares for resource utilization categories. In some embodiments, the IVR session management computing entity determines an outstanding resource utilization capacity based at least in part on a deviation measure of the total resource utilization capacity and a sum of the n minimum resource utilization shares of the n resource utilization categories. In some embodiments, the outstanding resource utilization capacity is determined based at least in part on the output of the equation $O = T - \Sigma_{i=1}^{n} M_i$, where O is the outstanding resource utilization capacity, T is the total resource utilization capacity, each $M_i$ is the minimum resource utilization share for each ith resource utilization category, and i is an index variable that iterates over n resource utilization categories.

The term "outstanding resource utilization share" may refer to a data construct that describes a discrete share of the outstanding resource utilization capacity that is assigned to the resource utilization category. In some embodiments, to determine the outstanding resource utilization share for a particular resource utilization category, the n resource utilization categories are first ranked based at least in part on a descending order of the number of service requests in their respective automated IVR session queues (i.e., such that a first resource utilization category is the resource utilization category having the highest number of service requests in its automated IVR session queue, a second resource utilization category is the resource utilization category having the second highest number of service requests in its automated IVR session queue, and so on), (ii) a category priority score is assigned to each resource utilization category based at least in part on its position in the descending order (e.g., such that the ith resource utilization category in the descending order is associated with a category priority score of i), and (iii) the n resource utilization categories are ranked based at least in part on a descending order of the n category priority scores for the n resource utilization category. After performing operations (i)-(iii) mentioned herein, an IVR session management computing entity may first initialize all n outstanding resource utilization shares for the n resource utilization categories to zero, and then perform the following operations until outstanding resource utilization capacity (O) reaches zero: incrementing the outstanding resource utilization share of a top resource utilization category in the ranking determined in (iii), moving the top resource utilization category in the ranking determined in (iii) to the bottom of the ranking determined in (iii), and decrementing O.

The term "resource utilization share" may refer to a data construct that describes a number of session requests for a corresponding resource utilization category that may be handled at a particular determination. In some embodiments, the IVR session management computing entity determines the resource utilization share for an ith resource utilization category based at least in part on the output of the equation $R_i = M_i + O_i$, where $R_i$ is the resource utilization category for the ith resource utilization category, $M_i$ is the minimum resource utilization category for the ith resource utilization category, and $O_i$ is the outstanding resource utilization category for the ith resource utilization category.

The term "resource utilization determination" may refer to a data construct that describes may be determined based at least in part on whether a corresponding session request is among the top $R_i$ session requests in the automated IVR session queue for the resource utilization category that is associated with the session request. In some embodiments, the resource allocation determination determines whether a corresponding session request is among the top $R_i$ session requests in the automated IVR session queue for the resource utilization category that is associated with the corresponding session request. In some embodiments, if the corresponding session request is among the top $R_i$ session requests in the automated IVR session queue for the resource utilization category that is associated with the corresponding session request, then the resource allocation determination for the corresponding session request is assigned an affirmative value. In some embodiments, if the corresponding session request is not among the top $R_i$ session requests in the automated IVR session queue for the resource utilization category that is associated with the corresponding session request, then the resource allocation determination for the corresponding session request is assigned a negative value.

The term "IVR navigation tree data object" may refer to a data construct that describes a sequence of IVR voice prompts that may be presented by the target IVR system during an IVR session. For example, the IVR navigation tree data object for a target IVR system may describe that: (i) at first, the target IVR system will present an IVR voice prompt requesting language selection, which can be selected as English or Spanish, (ii) upon selecting English, the target IVR system will present an English IVR voice prompt inquiring if a target entity (e.g., a health insurance member) has a social security number, (iii) upon selecting English and selecting that the target entity has a social security number, the target IVR system will present an English IVR voice prompt asking the use to input the social security number for the target entity, and so on. In some embodiments, the IVR navigation tree data object is a tree data object. In some embodiments, each node of the IVR navigation tree data object is an IVR event state node that may correspond to a defined operational state of a corresponding IVR system. In some of the noted embodiments, the IVR navigation tree data object describes potential sequential and/or conditional relationships between occurrence of various defined operational states of the noted corresponding IVR system.

The term "iterative IVR navigation routine" may refer to a data construct that describes a set of operations that, when performed, iteratively navigate an automated IVR session by, during each iteration, mapping the iteration to a current IVR state node of a corresponding IVR navigation tree data object (e.g., an IVR navigation tree data object associated with a target IVR system for the automated IVR session), mapping the IVR voice prompt for the iteration to an iterative IVR prompt class for the iteration based at least in part on the current IVR state for the iteration, mapping the iterative IVR prompt class for the iteration to an iterative IVR navigation operation for the iteration, and performing the iterative IVR navigation operation for the iteration. In some embodiments, the iterative IVR navigation routine is terminated when the current IVR state node for an iteration is a leaf IVR state node, when the iterative IVR prompt class for an iteration is an IVR interaction termination class, or both.

The term "current IVR state node" may refer to a data construct that describes an IVR state node of an IVR navigation tree data object associated with an automated IVR session that corresponds to an assumed/inferred/precomputed operational state of the IVR system during a corresponding IVR navigation routine iteration. In some embodiments, the current IVR navigation routine iteration for the initial current IVR navigation routine iteration is set to a root IVR state node of an IVR navigation tree data object associated with a corresponding automated IVR session. In some embodiments, the current IVR navigation routine iteration for each non-initial current IVR navigation routine iteration is set to a particular IVR state node that is associated with the iterative IVR prompt class for a previous IVR navigation routine iteration, where the particular IVR state node is a downstream IVR state node of a current IVR state node of the previous IVR navigation routine iteration.

The term "current IVR voice prompt" may refer to a data construct that describes feature data describing a recorded audio file and/or the recorded audio file itself, where the data construct describes voice data received by an IVR session management computing entity (e.g., via a voice engine of the IVR session management computing entity and from a request-transmitting client computing entity) after transmitting response data associated with the current IVR navigation routine iteration to the IVR system. In some embodiments, the current IVR voice prompt describes a recorded response of the IVR system to transmitting response data corresponding to the current IVR state node of the current IVR navigation routine iteration.

The term "voice prompt classification machine learning framework" may refer to a data construct that describes a set of machine learning models that are collectively configured to process a current IVR voice prompt for a current IVR navigation routine iteration to determine an iterative IVR prompt classification for the noted current IVR navigation routine iteration. In some embodiments, inputs to the voice prompt classification machine learning framework include a vector and/or a matrix describing a current IVR voice prompt, while outputs of the voice prompt classification machine learning framework include a vector and/or an atomic value describing a selected iterative IVR prompt classification. Accordingly, each non-leaf IVR state node may in some embodiments be associated with both a voice prompt classification machine learning model and a set of candidate iterative IVR prompt classes, where the voice prompt classification machine learning model for the particular non-leaf IVR state node may be configured to, for any current IVR navigation routine iteration that is associated with the particular non-leaf IVR state node as its current IVR state node, determine an iterative IVR prompt class from the set of candidate iterative IVR prompt classes associated with the particular non-leaf IVR state node. In some embodiments, each voice prompt classification machine learning model includes a convolutional acoustic processing machine learning model. In some embodiments, each voice prompt classification machine learning model is trained using training data entries each describing ground-truth iterative IVR prompt classification for a recorded IVR voice prompt.

The term "transitional iterative IVR prompt class" may refer to a data construct that describes an inferred class/category for an IVR voice prompt received during a corresponding IVR navigation routine iteration that, when mapped to the corresponding IVR navigation routine iteration, causes performance/execution of a subsequent IVR navigation routine iteration after the corresponding IVR navigation routine iteration, where the current IVR state node for the subsequent IVR navigation routine is one of the downstream IVR state nodes for the current event state node of the corresponding IVR navigation routine iteration that is associated with the transitional iterative IVR prompt class. For example, when a current IVR navigation routine iteration requires language selection from the language set consisting of English and Spanish, then the current IVR navigation routine iteration may be associated with a first transitional iterative IVR prompt class that is assigned to an IVR voice prompt received during the current IVR navigation routine iteration if the IVR voice prompt is predicted to indicate that the user has successfully chosen English as the selected language, as well as a second transitional iterative IVR prompt class that is assigned to an IVR voice prompt received during the current IVR navigation routine iteration if the IVR voice prompt is predicted to indicate that the user has successfully chosen Spanish as the selected language.

The term "IVR interaction termination class" may refer to a data construct that describes an inferred class/category for an IVR voice prompt received during a corresponding IVR navigation routine iteration that, when mapped to the corresponding IVR navigation routine iteration, causes termination of the iterative IVR navigation routine and the corresponding IVR voice session. In some embodiments, assignment of an IVR interaction termination class to a current IVR navigation routine indicates that, according to the IVR voice response received during the current IVR navigation routine, transmission of response data during the current IVR navigation routine has led to triggering of a process by the corresponding IVR system to transfer the call to a human agent (i.e., to terminate the automated IVR session). In some embodiments, the IVR interaction termination class for a current IVR navigation routine is mapped to an IVR interaction termination class if inferred voice/acoustic patterns in the IVR voice prompt received during the current IVR navigation routine correlate to voice/acoustic patterns of human agent transition IVR voice prompts that precede transferring of a call to a human agent (e.g., a human agent transition IVR voice prompt saying "you are now being transferred to a customer service representative"). Accordingly, in some embodiments, the training data used to train the voice prompt classification machine learning models of a voice prompt classification machine learning framework include a set of training entries that each associates a recording of a human agent transition IVR voice prompt for the IVR system to a ground-truth label that describes that the corresponding entry is associated with the IVR interaction termination class.

The term "IVR re-initiation class" may refer to a data construct that describes an inferred class/category for an IVR voice prompt received during a corresponding IVR navigation routine iteration that, when mapped to the corresponding IVR navigation routine iteration, causes performance/execution of a subsequent IVR navigation routine iteration after the corresponding IVR navigation routine iteration, where the current IVR state node for the subsequent IVR navigation routine is the root event state node for the corresponding IVR navigation tree data object. In some embodiments, assignment of the IVR re-initiation class to a corresponding IVR navigation routine iteration causes a subsequent navigation of the corresponding automated IVR session to an initial operational state. This may happen because a reliable determination about a downstream operational state cannot be made. In some embodiments, when a non-leaf IVR state node is associated with n downstream event nodes, where the set of iterative IVR prompt classes for the non-leaf IVR state node include n+1 iterative IVR prompt classes including n transitional iterative IVR prompt classes associated with the n downstream event nodes and an IVR interaction termination class (e.g., associated with predicted/inferred/detected human agent transition IVR voice prompts). In some of those embodiments, the voice prompt classification machine learning model for the particular non-leaf IVR state node is configured to generate, for a particular IVR navigation routine iteration that is associated with the particular non-leaf IVR state node, n+1 classification scores for the n+1 iterative IVR prompt classes. In some embodiments, if none of the n+1 transitional iterative IVR prompt classes satisfies (e.g., exceeds) a classification score threshold (e.g., a classification threshold of 0.50), then the particular IVR navigation routine iteration is assigned the IVR re-initiation class. However, if at least one of the n+1 classification scores satisfies (e.g., exceeds) a classification score threshold (e.g., a classification threshold of 0.50), then the particular IVR navigation routine iteration is assigned the iterative IVR prompt class that is associated with the highest classification score of the n+1 classification scores. Accordingly, in some embodiments, the IVR re-initiation class is a residual class/category that is assigned if none of the other classes/categories are deemed to be insufficiently predictive.

The term "IVR navigation operation" may refer to a data construct that describes a set of computer-implemented operations for causing a voice engine to execute/perform particular operations with respect to an automated IVR session in connection with the IVR system, and/or to modify performance/execution operations corresponding to subsequent IVR navigation routine iterations of the iterative IVR navigation routine. In some embodiments, when the iterative IVR prompt class for a current IVR navigation routine iteration is a transitional iterative IVR prompt class that is associated with a particular downstream IVR state node for a current IVR state node of the current IVR navigation routine iteration, then the corresponding iterative IVR navigation operation comprises maintaining the corresponding automated IVR session and/or performing a subsequent IVR navigation routine iteration whose respective current IVR state node is the particular downstream IVR state node. In some embodiments, when the iterative IVR prompt class for a current IVR navigation routine iteration is an IVR interaction termination class, then the corresponding iterative IVR navigation operation comprises causing the voice engine to terminate the automated IVR session and/or terminating performance/execution of the iterative IVR navigation routine. In some embodiments, when the iterative IVR prompt class for a current IVR navigation routine iteration is an IVR re-initiation class, then the corresponding iterative IVR navigation operation comprises maintaining the corresponding automated IVR session and/or performing a subsequent IVR navigation routine iteration whose respective current IVR state node is the root IVR state node of the VR navigation tree data object associated with the automated IVR session.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magneto resistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Framework

FIG. 1 is a schematic diagram of an example system architecture 100 for performing IVR interaction management operations described herein. The system architecture 100 includes an automated IVR interaction system 101 that is configured to establish and manage an automated IVR session with an IVR system 103, which may comprise at least one IVR system computing entities. The automated IVR interaction system comprises an IVR session management computing entity 106 and a storage subsystem 108. The IVR session management computing entity 106 includes a navigation coordinator 111, a record manager adapter 112, an input/output processor adapter 113, a voice engine 114, a configuration manager adapter 115, and a model interaction adapter 116.

The IVR session management computing entity 106 may be configured to, in response to a session request received from a client computing entity 102, establish the automated IVR session using the configuration manager adapter 115 and the voice engine 114. In some embodiments, the configuration manager adapter 115 is configured to retrieve configuration data associated with a session request that may describe at least one of: (i) a resource allocation determination for the session request, and (ii) one or more session initiation configuration parameters (e.g., a phone number) for the IVR system 103. In some embodiments, if the resource allocation determination for the session request describes an affirmative resource allocation determination, then the voice engine 114 uses the session initiation configuration parameters to perform session initiation operations that are configured to initiate the automated IVR session corresponding to the session request by connecting with the IVR system 103.

After initiating the automated IVR session, the IVR session management computing entity 106 may further be configured to navigate the automated IVR session using the record manager adapter 112, the model interaction adapter 116, the input/output processor adapter 113, and the voice engine 114. As used herein, navigating the automated IVR session may include performing a number of iterations of an IVR navigation routine, where each IVR navigation routine iteration routine comprises receiving a current IVR system voice prompt, determining an iterative IVR prompt class based at least in part on the current IVR system voice prompt, and performing an IVR navigation operation based at least in part on the iterative IVR prompt class.

In some embodiments, during each IVR navigation routine iteration routine, a current IVR system voice prompt is received and stored by the record manager adapter 112, where the current IVR system voice prompt may describe an IVR prompt received by the voice engine 114 via interacting with the IVR system 103 and provided to the record manager adapter 112 by the voice engine 114. Afterward, the model interaction adapter 116 causes a voice prompt classification machine learning framework to process the current IVR system voice prompt to determine an iterative IVR prompt class and provides the iterative IVR prompt class to the navigation coordinator 111. The navigation coordinator 111 may then be configured to map the iterative IVR prompt class to a corresponding IVR navigation operation. Examples of candidate IVR navigation operations include terminating the automated IVR session by causing the voice engine 114 to end the connection with the IVR system 103, returning the automated IVR session to a root IVR state by causing the voice engine 114 to transmit an IVR re-initiation input to the IVR system 103, or causing the automated IVR session to progress to a downstream root IVR system by causing the voice engine 114 to transmit IVR downstream navigation input corresponding to the particular downstream IVR state node to the IVR system 103. In some embodiments, the IVR downstream navigation input is determined based at least in part on input data retrieved by the input/output processor adapter 113 from the storage subsystem 108.

In some embodiments, after the termination of the automated IVR session, the IVR session management computing entity 106 may further be configured to determine an IVR session output corresponding to the automated IVR session. In some embodiments, the IVR session output is stored by the input/output processor adapter 113 on the storage subsystem 108.

Exemplary IVR Session Management Computing Entity

FIG. 2 provides a schematic of an IVR session management computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the IVR session management computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the IVR session management computing entity 106 may include or be in communication with a processing element 205 (also referred to as processors, processing circuitry, and/or similar terms used herein interchangeably) that communicate with other elements within the IVR session management computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the IVR session management computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the IVR session management computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the IVR session management computing entity 106 with the assistance of the processing element 205 and operating system.

As indicated, in one embodiment, the IVR session management computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the IVR session management computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the IVR session management computing entity 106 may include or be in communication with one or more input elements, such as a keyboard input, a mouse input, a touch screen/display input, motion input, movement input, audio input, pointing device input, joystick input, keypad input, and/or the like. The IVR session management computing entity 106 may also include or be in communication with one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the IVR session management computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the IVR session management computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the IVR session management computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the IVR session management computing entity 106 and/or various other computing entities.

In another embodiment, the client computing entity 102 may include one or more components or functionality that are the same or similar to those of the IVR session management computing entity 106, as described in greater detail above. As will be recognized, these frameworks and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention are configured to address technical challenges associated with efficiently and effectively facilitating real-time automated interactions with an IVR system by using voice prompt classification machine learning frameworks and IVR navigation tree data objects. As described below, by utilizing the noted techniques, various embodiment of the present invention reduce the number of predictive inferences that need to be performed during each current IVR navigation routine to O(n) predictive inferences, where n is the number of downstream IVR state nodes of a current IVR state node that is associated with the current IVR navigation routine. For example, n+2 predictive inferences will be determined, where n is the number of downstream IVR state nodes of a current IVR state node that is associated with the current IVR navigation routine, and where n predictive inferences are performed to determine classification scores for the n downstream IVR state nodes, one predictive inference is performed to determine whether to terminate the automated IVR session in response to a human agent transition IVR voice prompt, and one predictive inference is performed to determine whether to return to a root IVR state node if the preceding predictive inferences are not deemed irrelevant. Accordingly, by reducing the number of predictive inferences that need to be performed during each current IVR navigation routine to O(n) predictive inferences, where n is the number of downstream IVR state nodes of a current IVR state node that is associated with the current IVR navigation routine, various embodiments of the present invention reduce the number of computational operations that need to be performed to efficiently and effectively facilitate real-time automated interactions with an IVR system. In doing so, various embodiments of the present invention improve computational efficiency of real-time automated IVR interaction solutions.

Exemplary IVR Session Initiation Operations

FIG. 4 is a flowchart diagram of an example process 400 for establishing an automated IVR session between the IVR system 103 and the automated IVR interaction system 101. Via the various steps/operations of the process 400, the IVR session management computing entity 106 may be configured to determine when to initiate an automated IVR session corresponding to a session request.

The process 400 begins at step/operation 401 when the IVR session management computing entity 106 identifies (e.g., receives) the session request. In some embodiments, the IVR session management computing entity 106 is configured to receive the session request from a client computing entity. In some embodiments, the session request is a request for establishing an automated IVR session with a target IVR system (e.g., a target IVR system associated with a designated IVR system identifier). In some embodiments, the session request describes (e.g., in addition to identifying data describing the target IVR system) a resource utilization category and a triggering workflow.

In some embodiments, a resource utilization category describes a grouping of a subset of session requests received by the automated IVR interaction system 101, such that each session request received by the automated IVR interaction system 101 may belong to one and only one resource utilization category. For example, in some embodiments, automated IVR interaction system 101 may be configured to provide IVR interaction services (i.e., IVR session initiation services and IVR session navigation services) to n computing entities associated with n client identifiers. In some of the noted embodiments, n resource utilization categories may be defined, with each resource utilization category describing a designation attributed to session requests transmitted by client computing entities of a corresponding client computing entity of the n client computing entities. In some embodiments, each resource utilization category may be associated with a minimum resource utilization share, which may be used to determine a required share of computing resource units associated with the voice engine 114 of the IVR session management computing entity 106 that should at all times be allocated to performing IVR interaction operations corresponding to the session requests associated with the resource utilization category.

In some embodiments, a triggering workflow describes a processing workflow performed by a request-transmitting client computing entity that has led to generation and transition of the session request by the noted client computing entity. In some embodiments, the automated IVR interaction system 101 is configured to provide IVR interaction services (i.e., IVR session initiation services and IVR session navigation services) to n computing entities associated with n client identifiers. In some of the noted embodiments, each of the n computing entities is configured to perform operations that correspond to a set of processing workflows, where each processing workflow may include a sequence of workflow operations, and where some of the workflow operations may include transmitting session requests for automated IVR session to the automated IVR interaction system 101. Accordingly, each session request may be associated with a processing workflow that has triggered the transmission of the session request to the IVR system 103 via causing performance of a workflow operation that has led to transmitting the session request.

For example, in some embodiments, a processing workflow for determining a Coordination of Benefits (COB) determination for a senior member may require: (i) determining whether health insurance inventory data describes that the senior member has Medicare coverage, and (ii) in response to determining that the health insurance inventory data does not describe that the senior member has Medicare coverage, requesting an automated IVR session with the IVR system of the Centers for Medicare & Medicaid Services (CMS) to determine whether the senior member has Medicare coverage. In some embodiments, if the processing workflow is performed with respect to a particular senior member, and if a negative determination at operation (1) leads to transmitting a session request at operation (2), then the session request may describe an identifier of the noted processing workflow.

At step/operation 402, the IVR session management computing entity 106 determines, at a determination time associated with an iterative performance of the resource allocation determination routine 411 that comprises sequential performance of steps/operations 402-404, a session position for the session request in an automated IVR session queue for the resource utilization category that is associated with the session request. In some embodiments, a session position describes an assigned discrete position of a corresponding session request within an automated IVR session queue for a resource utilization category (e.g., a respective request-transmitting client computing entity) that is associated with the resource utilization category.

As described above, session requests identified (e.g., received) by the IVR session management computing entity 106 may be mapped to a set of resource utilization categories in a one-to-many fashion, such that each session request is mapped to one resource utilization category, and each resource utilization category may be associated with one or more session requests. In some embodiments, the one or more session requests associated with a resource utilization category are ordered by an automated IVR session queue for the resource utilization category, where the automated IVR session queue for the resource utilization category describes a discrete session position for each session request associated with the resource utilization category. For example, if a resource utilization category is associated with session requests R1, R2, and R3, then an example automated IVR session queue for the resource utilization category may assign session request R2 to a first session position, session request R1 to a second session position, and session request R3 to a third session position.

In some embodiments, step/operation 402 may be performed in accordance with the process that is depicted in FIG. 5, which is an example process for determining the session position for a particular session request that is associated with a particular resource utilization category (e.g., a particular request-transmitting client computing entity), and where the particular resource utilization category is in turn associated with n session requests including the particular session request.

The process that is depicted in FIG. 5 begins at step/operation 501 when the IVR session management computing entity 106 determines a temporal priority score for the particular session request that describes a deviation measure between a current timestamp and a receipt timestamp of the particular session request, where the receipt timestamp describes a time when the particular session request was first received by the IVR session management computing entity 106. In some embodiments, the temporal priority score for a session request describes how long the session request has been outstanding (e.g., waiting) in the automated IVR session queue for the resource allocation category associated with the noted session request.

At step/operation 502, the IVR session management computing entity 106 determines a workflow priority score for the particular session request based at least in part on the triggering workflow associated with the particular session request. In some embodiments, each triggering workflow of n triggering workflows associated with the client computing entities 102 that transmit session requests to the IVR session management computing entity 106 may be associated with a corresponding workflow priority score. In some embodiments, to determine workflow priority score for the particular session request: (i) the triggering workflow associated with the particular session request is identified, and (ii) the corresponding workflow priority score for the identified triggering workflow is determined.

At step/operation 503, the IVR session management computing entity 106 determines a total priority score for the particular session request based at least in part on the temporal priority score for the particular session request and the workflow priority score. In some embodiments, the IVR session management computing entity 106 determines a total priority score for the particular session request based at least in part on a weighted combination of the temporal priority score for the particular session request and the workflow priority score for the particular session request. In some embodiments, the IVR session management computing entity 106 determines a total priority score for the particular session request based at least in part on the output of processing the temporal priority score for the particular session request and the workflow priority score for the particular session request using a total priority score generation machine learning model.

At step/operation 504, the IVR session management computing entity 106 determines the session position for the particular session request based at least in part on the n total priority scores for the n session requests associated with the particular resource utilization category. In some embodiments, to determine the session position for the particular session request, the IVR session management computing entity 106 ranks the n session requests based at least in part on a descending order of the n total priority scores, and then assigns the session position i to the particular session request, where i is the position of the particular session request in the descending order of total priority scores.

Returning to FIG. 4, at step/operation 403, the IVR session management computing entity 106 determines a resource allocation share for the resource utilization category that is associated with the session request. The resource allocation share may describe a number of session requests associated with a corresponding resource utilization category that can, at the particular determination time associated with the iterative performance of the resource allocation determination routine 411, use computing resource units associated with the voice engine 114 of the IVR session management computing entity 106. For example, the IVR session management computing entity 106 may determine that, at the particular determination time, two session requests for a particular resource utilization category (e.g., a particular client computing entity) may be permitted to use computing resource units associated with the voice engine 114 of the IVR session management computing entity 106. In this example, the resource allocation share for the particular resource utilization category may be two.

In some embodiments, to determine the resource allocation shares for n resource utilization categories, the following operations are performed: (i) a total resource utilization capacity (referred to herein as 7) describing an estimated/preconfigured total number of session requests that may at the determination time use the computing resource units associated with the voice engine 114 of the IVR session management computing entity 106 is determined, (ii) for each resource utilization category of the n resource utilization categories, a minimum resource utilization share (referred to herein as $M_i$ for an ith resource utilization category) describing a minimum number of session requests of the resource utilization category that may at a determination time use the computing resource units associated with the voice engine 114 of the IVR session management computing entity 106 is determined, (iii) an outstanding resource utilization capacity (referred to herein as O, which may be determined using the operations of the equation $O=T-\Sigma_{i=1}^{n} M_i$) describing a number of session requests that may at a determination time use the computing resource units associated with the voice engine 114 of the IVR session management computing entity 106 independent of the minimum resource utilization shares determined at (ii) is determined, (iv) for each resource utilization category of the n resource utilization categories, an outstanding resource utilization share (referred to herein as $O_i$ for an ith resource utilization category) describing a share of the outstanding resource utilization capacity that is assigned to the resource utilization category is determined, and (iv) for each resource utilization category of the n resource utilization categories, the resource allocation share (referred to herein as $R_i$ for an ith resource utilization category) is determined by performing the operations of the equation $R_i=M_i+O_i$.

In some embodiments, step/operation 403 may be performed in accordance with the process that is depicted in FIG. 6, which is an example process for determining n resource allocation shares for n resource utilization categories (e.g., n request-transmitting client computing entities that are configured to transmit session requests to the IVR session management computing entity 106) at a particular determination time (e.g., a particular determination time associated with an iterative performance of the resource allocation determination routine 411).

The process that is depicted in FIG. 6 begins at step/operation 601 when the IVR session management computing entity 106 determines a total resource utilization capacity for the IVR session management computing entity 106 that describes a total number of session requests that can use computing resources of the voice engine 114 of the IVR session management computing entity 106 at the particular determination time across all resource utilization categories (e.g., across all client identifiers). For example, the total resource utilization capacity may describe that, at a corresponding determination time, ten session requests may use computing resources of the voice engine 114 of the IVR session management computing entity 106.

In some embodiments, the total resource utilization capacity is constant across time, such that a constant number of session requests may use computing resources of the voice engine 114 of the IVR session management computing entity 106 at any determination time. In some embodiments, the total resource utilization capacity for a particular determination time is determined based at least in part on a total number of session requests in the n automated IVR session queues for the n resource utilization categories at the particular determination time, the total number of computing resource units of the voice engine 114 at the particular determination time, and/or the total number of triggering workflows associated with the total number of session requests in the n automated IVR session queues for the n resource utilization categories at the particular determination time.

At step/operation 602, the IVR session management computing entity 106 determines, for each resource utilization category of the n resource utilization categories, a minimum resource utilization share that describes a minimum number of session requests of the resource utilization category that may at a determination time use the computing resource units associated with the voice engine 114 of the IVR session management computing entity 106. For example, the minimum resource utilization share for a particular resource utilization category may require that, at the particular determination time (e.g., at any determination time), at least two session requests of the resource utilization category may use the computing resource units associated with the voice engine 114 of the IVR session management computing entity 106. In some embodiments, this minimum resource allocation may ensure that, at each time, a required share of the computing resources of the voice engine 114 are reserved for each resource utilization category (e.g., for each client), to ensure that each client can at all times enjoy the IVR interaction services of the IVR session management computing entity 106 without wait-times imposed by the multi-tenant/multi-client nature of the IVR interaction service provision architecture presented by some embodiments of the present invention.

At step/operation 603, the IVR session management computing entity 106 determines an outstanding resource utilization capacity based at least in part on a deviation measure of the total resource utilization capacity and a sum of the n minimum resource utilization shares of the n resource utilization categories. In some embodiments, the outstanding resource utilization capacity is determined based at least in part on the output of the equation $O=T-\Sigma_{i=1}^{n} M_i$, where O is the outstanding resource utilization capacity, T is the total resource utilization capacity across all resource utilization categories, each $M_i$ is the minimum resource utilization share for an ith resource utilization category, and i is an index variable that iterates over n resource utilization categories. In some embodiments, the outstanding resource utilization capacity is determined based at least in part on the output of the equation $O=\text{floor}(T-\Sigma_{i=1}^{n} M_i)$, where O is the outstanding resource utilization capacity, T is the total resource utilization capacity across all resource utilization categories, each $M_i$ is the minimum resource utilization share for an ith resource utilization category, i is an index variable that iterates over n resource utilization categories, and floor(.) is a floor function that returns the largest integer that is less than or equal than the value of its corresponding input.

At step/operation 604, the IVR session management computing entity 106 determines, for each resource utilization category of the n resource utilization categories, an outstanding resource utilization share that describes a discrete share of the outstanding resource utilization capacity that is assigned to the resource utilization category. In some embodiments, to determine the outstanding resource utilization share for a particular resource utilization category, the n resource utilization categories are first ranked based at least in part on a descending order of the number of service requests in their respective automated IVR session queues (i.e., such that a first resource utilization category is the resource utilization category having the highest number of service requests in its automated IVR session queue, a second resource utilization category is the resource utilization category having the second highest number of service requests in its automated IVR session queue, and so on), (ii) a category priority score is assigned to each resource utilization category based at least in part on its position in the descending order (e.g., such that the ith resource utilization category in the descending order is associated with a category priority score of i), and (iii) the n resource utilization categories are ranked based at least in part on a descending order of the n category priority scores for the n resource utilization category. After performing operations (i)-(iii) mentioned herein, the IVR session management computing entity 106 may first initialize all n outstanding resource utilization shares for the n resource utilization categories to zero, and then perform the following operations until outstanding resource utilization capacity (O) reaches zero: incrementing the outstanding resource utilization share of a top resource utilization category in the ranking determined in (iii), moving the top resource utilization category in the ranking determined in (iii) to the bottom of the ranking determined in (iii) (i.e., so that the previous second top resource utilization category is now the top resource utilization category), and decrementing O.

At step/operation 605, the IVR session management computing entity 106 determines, for each resource utilization category of the n resource utilization categories, a resource utilization share based at least in part on the minimum resource utilization share for the resource utilization category and the outstanding resource utilization share for the resource utilization category. In some embodiments, the IVR session management computing entity 106 determines the resource utilization share for an ith resource utilization category based at least in part on the output of the equation $R_i=M_i+O_i$, where $R_i$ is the resource utilization category for the ith resource utilization category, $M_i$ is the minimum resource utilization category for the ith resource utilization category, and $O_i$ is the outstanding resource utilization category for the ith resource utilization category.

Returning to FIG. 4, at step/operation 404, the IVR session management computing entity 106 determines whether a resource allocation determination for the session request has an affirmative value, where the resource allocation determination for the session request may be determined based at least in part on whether the session request is among the top $R_i$ session requests in the automated IVR session queue for the ith resource utilization category that is associated with the session request (with $R_i$ being the resource utilization share for the noted resource utilization share as determined above). In some embodiments, the resource allocation determination determines whether a corresponding session request is among the top $R_i$ session requests in the automated IVR session queue for the ith resource utilization category that is associated with the corresponding session request. In some embodiments, if the corresponding session request is among the top $R_i$ session requests in the automated IVR session queue for the ith resource utilization category that is associated with the corresponding session request, then the resource allocation determination for the corresponding session request is assigned an affirmative value. In some embodiments, if the corresponding session request is not among the top $R_i$ session requests in the automated IVR session queue for the ith resource utilization category that is associated with the corresponding session request, then the resource allocation determination for the corresponding session request is assigned a negative value.

At step/operation 405, in response to determining that the resource allocation determination for the session request has the affirmative value, the IVR session management computing entity 106 performs IVR interaction services for the session request (e.g., using at least some of the techniques described below with reference to the process 700 of FIG. 7) and/or removes the session request from the automated IVR session queue for the resource allocation category associated with the automated IVR session. However, in response to determining that the resource allocation determination for the session request has a negative value, the IVR session management computing entity 106 returns to step/operation 402 to perform a new iterative performance of the resource allocation determination routine 411 by determining a new session position for the session request at the new determination time associated with the new iterative performance of the resource allocation determination routine 411. In some embodiments, resource allocation determination routine 411 is performed repeatedly (e.g., periodically) until the session request has an affirmative-valued resource allocation determination and is removed from the corresponding automated IVR session queue.

Exemplary IVR Session Navigation Operations

FIG. 7 is a flowchart diagram of an example process 700 for navigating an automated IVR session between the IVR system 103 and the automated IVR interaction system 101. Via the various steps/operations of the process 400, the IVR session management computing entity 106 may be configured to perform IVR navigation routine iterations of an iterative IVR navigation routine 711 to navigate an established automated IVR session (e.g., an established automated IVR session that is established using at least some of the techniques described above with reference to process 400 of FIG. 4) from the beginning to termination.

The process 700 begins at step/operation 701 when the IVR session management computing entity 106 identifies an IVR navigation tree data object associated with the automated IVR session. In some embodiments, the target IVR system associated with the automated IVR session is associated with an IVR navigation tree data object that describes a sequence of IVR voice prompts that may be presented by the target IVR system during an IVR session. For example, the IVR navigation tree data object for a target IVR system may describe that: (i) at first, the target IVR system will present an IVR voice prompt requesting language selection, which can be selected as English or Spanish, (ii) upon selecting English, the target IVR system will present an English IVR voice prompt inquiring if a target entity (e.g., a health insurance member) has a social security number, (iii) upon selecting English and selecting that the target entity has a social security number, the target IVR system will present an English IVR voice prompt asking the use to input the social security number for the target entity, and so on. In some embodiments, each node of an IVR navigation tree data object is an IVR state node that defines a potential operational state of an IVR system as determined based at least in part on the voice data provided by the IVR system.

An operational example of an IVR navigation tree data object 800 is depicted in FIG. 8. As depicted in FIG. 8, the IVR navigation tree data object 800 has a root IVR state node 801 that is an entry point of the IVR navigation logic associated with the corresponding target IVR system and presents a query about whether a target entity has an available social security number. As further depicted in FIG. 8, the root IVR state node 801 has two downstream (i.e., child) IVR state nodes: (i) the downstream IVR state node 811 that presents a query about the social security number of target entity, and (ii) the downstream IVR state node 812 that presents a query about whether the target entity has an available birth date and zip code. In some embodiments, the root IVR state node 801 is the upstream (i.e., parent) IVR state node of the downstream IVR state node 811 and the downstream IVR state node 812, which collectively form the downstream state subset for the root IVR state node 801 (i.e., the subset of IVR state nodes that are direct children of root IVR state node 801).

As further depicted in FIG. 8, the IVR navigation tree data object 800 includes two downstream IVR state nodes for the IVR state node 812: (i) the downstream IVR state node 821 that presents a query about the birth date of the target entity, which itself has the downstream IVR state node 831 that presents a query about the zip code of the target entity, and (ii) the downstream IVR state node 822 that announces that records for the target entity are unreachable. In some embodiments, the downstream IVR state node 822 and the downstream IVR state node 831 are leaf IVR state nodes of the IVR navigation tree data object 800.

Returning to FIG. 7, after step/operation 701, the IVR session management computing entity 106 performs a required number of IVR navigation routine iterations of an iterative IVR navigation routine 711 until the IVR session management computing entity 106 terminates the iterative IVR navigation routine 711. In some embodiments, the iterative IVR navigation routine 711 may be configured to iteratively navigate an automated IVR session by, during each iteration, mapping the iteration to a current IVR state node of a corresponding IVR navigation tree data object (e.g., an IVR navigation tree data object associated with a target IVR system for the automated IVR session), mapping the IVR voice prompt for the iteration to an iterative IVR prompt class for the iteration based at least in part on the current IVR state for the iteration, mapping the iterative IVR prompt class for the iteration to an iterative IVR navigation operation for the iteration, and/or performing the iterative IVR navigation operation for the iteration. In some embodiments, the iterative IVR navigation routine 711 is terminated when the current IVR state node for an iteration is a leaf IVR state node, when the iterative IVR prompt class for an iteration is an IVR interaction termination class, or both.

After step/operation 701, during each current IVR navigation routine iteration of the iterative IVR navigation routine 711, steps/operations 702-707 may be performed by the IVR session management computing entity 106.

At step/operation 702, during a current IVR navigation routine iteration, the IVR session management computing entity 106 identifies (e.g., determines) a current IVR state node for the current IVR navigation routine iteration. The current IVR state node may describe an IVR state node of an IVR navigation tree data object associated with an automated IVR session that corresponds to an assumed/inferred/precomputed operational state of the IVR system during the corresponding IVR navigation routine iteration. In some embodiments, the current IVR navigation routine iteration for the initial current IVR navigation routine iteration is set to a root IVR state node of an IVR navigation tree data object associated with a corresponding automated IVR session (e.g., with the root IVR state node 801 of the IVR navigation tree data object 800 that is depicted in FIG. 8). In some embodiments, the current IVR navigation routine iteration for each non-initial current IVR navigation routine iteration is set to a particular IVR state node that is associated with the iterative IVR prompt class for a previous IVR navigation routine iteration, where the particular IVR state node is a downstream IVR state node of a current IVR state node of the previous IVR navigation routine iteration.

For example, in an exemplary embodiment, given an automated IVR session that is associated with the IVR navigation tree data object 800 of FIG. 8, during an initial IVR navigation routine iteration, the current IVR state node for the initial IVR navigation routine iteration may be set to root IVR state node 801, and the iterative IVR prompt class for the initial IVR navigation routine iteration may either correspond to the downstream IVR state node 811 or the downstream IVR state node 812. In this exemplary embodiment, if the iterative IVR prompt class for the initial IVR navigation routine iteration corresponds to the downstream IVR state node 811, then the current IVR state node for a second IVR navigation routine iteration may be the downstream IVR state node 811. However, if the iterative IVR prompt class for the initial IVR navigation routine iteration corresponds to the downstream IVR state node 812, then the current IVR state node for the second IVR navigation routine iteration may be the downstream IVR state node 812.

At step/operation 703, during a current IVR navigation routine iteration, the IVR session management computing entity 106 causes the voice engine 114 to transmit, to the IVR system 103, response data describing data describing selections and/or information that should be provided during an operational state of the automated IVR session that is characterized by the current IVR state node for the current IVR navigation routine iteration. For example, if the current IVR state node requires transmission of a keypad selection, the automated IVR interaction system causes the voice engine 114 to transmit, to the IVR system 103, input data describing a keypad selection. As another example, if the current IVR state node requires transmission of a voiced selection, the automated IVR interaction system causes the voice engine 114 to transmit, to the IVR system 103, input data describing a voiced selection (e.g., a synthetically-generated voiced selection generated using a text-to-speech solution). As yet another example, if the current IVR state node requires transmission of data describing information associated with a target entity (e.g., a social security number of a target entity), the automated IVR interaction system causes the voice engine 114 to transmit, to the IVR system 103, input data describing the requested information using an allowed format (e.g., keypad selection, voice prompts, and/or the like), where the underlying information fields may be extracted from a target entity profile (e.g., a member profile) associated with the target entity that is stored in the storage subsystem 108 by the input/output processor adapter 113.

At step/operation 704, during a current IVR navigation routine iteration, and in response to transmission of the response data associated with the current IVR state node for the current IVR navigation routine iteration by the voice engine 114 to the IVR system 103, the IVR session management computing entity 106 identifies (e.g., receives) a current IVR voice prompt for the current IVR navigation routine iteration. In some embodiments, a current IVR voice prompt for the current IVR navigation routine describes voice data received by the IVR session management computing entity 106 (e.g., via a voice engine 114 of the IVR session management computing entity 106 and from a request-transmitting client computing entity) after transmitting response data associated with the current IVR navigation routine iteration to the IVR system 103. In some embodiments, the current IVR voice prompt describes a recorded response of the IVR system 103 to transmitting response data corresponding to the current IVR state node of the current IVR navigation routine iteration.

At step/operation 705, during a current IVR navigation routine iteration, the IVR session management computing entity 106 determines, using a voice prompt classification machine learning framework and based at least in part on the current IVR voice prompt for the current IVR navigation routine iteration, an iterative IVR prompt class for the current IVR navigation routine iteration. The iterative IVR prompt class may be selected from a set of candidate iterative IVR prompt classes for the current IVR state node for the IVR navigation routine iteration and using a voice prompt classification machine learning model of the voice prompt classification machine learning framework that is configured to generate iterative IVR prompt classes for IVR navigation routine iterations that are associated with the noted current IVR navigation state. The iterative IVR prompt class may be an inferred class/category for IVR voice prompt of a corresponding IVR navigation routine iteration.

In some embodiments, given n non-leaf IVR state nodes defined by an IVR navigation tree data object, the voice prompt classification machine learning framework associated with the voice prompt classification machine learning framework may include n voice prompt classification machine learning models. Each voice prompt classification machine learning model of the n voice prompt classification machine learning models may be associated with a respective non-leaf IVR state node as its current IVR state node and may be configured to generate iterative IVR prompt classes for those IVR navigation routine iterations that are associated with the respective non-leaf IVR state node from a set of candidate iterative IVR prompt classes for the respective non-leaf IVR state node.

Accordingly, each non-leaf IVR state node may in some embodiments be associated with both a distinct voice prompt classification machine learning model and a distinct set of candidate iterative IVR prompt classes, where the voice prompt classification machine learning model for the particular non-leaf IVR state node may be configured to, for any current IVR navigation routine iteration that is associated with the particular non-leaf IVR state node as its current IVR state node, determine an iterative IVR prompt class from the set of candidate iterative IVR prompt classes associated with the particular non-leaf IVR state node. For example, the root IVR state node 801 of the IVR navigation tree data object 800 that is depicted in FIG. 8 (which is a non-leaf IVR state node) may be associated with four candidate iterative IVR prompt classes: a first transitional iterative IVR prompt class that is associated with the downstream IVR state node 811, a second transitional iterative IVR prompt class that is associated with the downstream IVR state node 812, an IVR interaction termination class, and an IVR re-initiation class. In this example, the root IVR state node 801 may be associated with a voice prompt classification machine learning model that is configured to process an IVR voice prompt for a current IVR navigation routine iteration that is associated with the root IVR state node 801 as its current IVR state node (e.g., an initial IVR navigation routine iteration or an IVR navigation routine iteration that is performed/executed subsequent to a determination of an IVR re-initiation class during a preceding IVR navigation routine iteration) to select one of the noted iterative IVR prompt classes for the noted current IVR navigation routine iteration.

In some embodiments, the set of candidate iterative IVR prompt classes for a particular non-leaf IVR state node comprise at least one of the following: (i) for each downstream IVR state node of the non-leaf IVR state node (e.g., for each of downstream IVR state node 811 and the downstream IVR state node 812 when the particular non-leaf IVR state node is the root IVR state node 801 of the IVR navigation tree data object 800 that is depicted in FIG. 8), a transitional iterative IVR prompt class, (ii) an IVR interaction termination class, and (iii) an IVR re-initiation class.

In some embodiments, a transitional iterative IVR prompt class is an inferred class/category for an IVR voice prompt received during a corresponding IVR navigation routine iteration that, when mapped to the corresponding IVR navigation routine iteration, causes performance/execution of a subsequent IVR navigation routine iteration after the corresponding IVR navigation routine iteration, where the current IVR state node for the subsequent IVR navigation routine is one of the downstream IVR state nodes for the current event state node of the corresponding IVR navigation routine iteration that is associated with the transitional iterative IVR prompt class. For example, when a current IVR navigation routine iteration requires language selection from the language set consisting of English and Spanish, then the current IVR navigation routine iteration may be associated with a first transitional iterative IVR prompt class that is assigned to an IVR voice prompt received during the current IVR navigation routine iteration if the IVR voice prompt is predicted to indicate that the user has successfully chosen English as the selected language, as well as a second transitional iterative IVR prompt class that is assigned to an IVR voice prompt received during the current IVR navigation routine iteration if the IVR voice prompt is predicted to indicate that the user has successfully chosen Spanish as the selected language.

In some embodiments, an IVR interaction termination class is an inferred class/category for an IVR voice prompt received during a corresponding IVR navigation routine iteration that, when mapped to the corresponding IVR navigation routine iteration, causes termination of the iterative IVR navigation routine 711 and the corresponding IVR voice session. In some embodiments, assignment of an IVR interaction termination class to a current IVR navigation routine indicates that, according to the IVR voice response received during the current IVR navigation routine, transmission of response data during the current IVR navigation routine has led to triggering of a process by the corresponding IVR system to transfer the call to a human agent (i.e., to terminate the automated IVR session). In some embodiments, the IVR interaction termination class for a current IVR navigation routine is mapped to an IVR interaction termination class if inferred voice/acoustic patterns in the IVR voice prompt received during the current IVR navigation routine correlate to voice/acoustic patterns of human agent transition IVR voice prompts that precede transferring of a call to a human agent (e.g., a human agent transition IVR voice prompt saying "you are now being transferred to a customer service representative"). Accordingly, in some embodiments, the training data used to train the voice prompt classification machine learning models of a voice prompt classification machine learning framework include a set of training entries that each associates a recording of a human agent transition IVR voice prompt for the IVR system 103 to a ground-truth label that describes that the corresponding entry is associated with the IVR interaction termination class.

In some embodiments, an IVR re-initiation class is an inferred class/category for an IVR voice prompt received during a corresponding IVR navigation routine iteration that, when mapped to the corresponding IVR navigation routine iteration, causes performance/execution of a subsequent IVR navigation routine iteration after the corresponding IVR navigation routine iteration, where the current IVR state node for the subsequent IVR navigation routine is the root event state node for the corresponding IVR navigation tree data object. In some embodiments, assignment of the IVR re-initiation class to a corresponding IVR navigation routine iteration causes a subsequent navigation of the corresponding automated IVR session to an initial operational state. This may happen because a reliable determination about a downstream operational state cannot be made.

In some embodiments, when a non-leaf IVR state node is associated with n downstream event nodes, then the set of iterative IVR prompt classes for the non-leaf IVR state node include only n transitional iterative IVR prompt classes associated with the n downstream event nodes. In some of those embodiments, the voice prompt classification machine learning model for the particular non-leaf IVR state node is configured to generate, for a particular IVR navigation routine iteration that is associated with the particular non-leaf IVR state node, n classification scores for the n transitional iterative IVR prompt classes. In some embodiments, if none of the n classification scores satisfies (e.g., exceeds) a classification score threshold (e.g., a classification threshold of 0.50), then the particular IVR navigation routine iteration is assigned the IVR re-initiation class. However, if at least one of the n classification scores satisfies (e.g., exceeds) a classification score threshold (e.g., a classification threshold of 0.50), then the particular IVR navigation routine iteration is assigned the iterative IVR prompt class that is associated with the highest classification score of the n classification scores. Accordingly, in some embodiments, the IVR re-initiation class is a residual class/category that is assigned if none of the other classes/categories are deemed to be insufficiently predictive.

In some embodiments, when a non-leaf IVR state node is associated with n downstream event nodes, where the set of iterative IVR prompt classes for the non-leaf IVR state node include n+1 iterative IVR prompt classes including n transitional iterative IVR prompt classes associated with the n downstream event nodes and an IVR interaction termination class (e.g., associated with predicted/inferred/detected human agent transition IVR voice prompts). In some of those embodiments, the voice prompt classification machine learning model for the particular non-leaf IVR state node is configured to generate, for a particular IVR navigation routine iteration that is associated with the particular non-leaf IVR state node, n+1 classification scores for the n+1 iterative IVR prompt classes. In some embodiments, if none of the n+1 transitional iterative IVR prompt classes satisfies (e.g., exceeds) a classification score threshold (e.g., a classification threshold of 0.50), then the particular IVR navigation routine iteration is assigned the IVR re-initiation class. However, if at least one of the n+1 classification scores satisfies (e.g., exceeds) a classification score threshold (e.g., a classification threshold of 0.50), then the particular IVR navigation routine iteration is assigned the iterative IVR prompt class that is associated with the highest classification score of the n+1 classification scores. Accordingly, in some embodiments, the IVR re-initiation class is a residual class/category that is assigned if none of the other classes/categories are deemed to be insufficiently predictive.

At step/operation 706, during a current IVR navigation routine iteration, the IVR session management computing entity 106 determines an iterative IVR navigation operation for the current IVR navigation routine iteration based at least in part on the iterative IVR prompt class for the current IVR navigation routine iteration. In some embodiments, the iterative IVR navigation operation describes a set of computer-implemented actions performed to cause a voice engine 114 to execute/perform particular operations with respect to an automated IVR session in connection with the IVR system 103, and/or to modify performance/execution operations corresponding to subsequent IVR navigation routine iterations of the iterative IVR navigation routine 711.

In some embodiments, when the iterative IVR prompt class for a current IVR navigation routine iteration is a transitional iterative IVR prompt class that is associated with a particular downstream IVR state node for a current IVR state node of the current IVR navigation routine iteration, then the corresponding iterative IVR navigation operation comprises maintaining the corresponding automated IVR session and/or performing a subsequent IVR navigation routine iteration whose respective current IVR state node is the particular downstream IVR state node. For example, during a current IVR navigation routine iteration whose current IVR state node is the root IVR state node 801 of the IVR navigation tree data object 800 that is depicted in FIG. 8, if the iterative IVR prompt class for the current IVR navigation routine iteration is a transitional iterative IVR prompt class that is associated with the downstream IVR state node 811, then the corresponding iterative IVR navigation operation for the noted current IVR navigation routine iteration may include performing a next IVR navigation routine iteration whose current IVR state node is the downstream IVR state node 811. This may lead, during the performance/execution of the next IVR navigation routine iteration, to providing the response data including expected data for the downstream IVR state node 811 (e.g., response data describing social security number of a target entity), as well as to determining an iterative IVR prompt class from a set of iterative IVR prompt classes that comprise a transitional iterative IVR prompt class for the downstream IVR state node 821 and the downstream IVR state node 822.

In some embodiments, when the iterative IVR prompt class for a current IVR navigation routine iteration is an IVR interaction termination class, then the corresponding iterative IVR navigation operation comprises causing the voice engine 114 to terminate the automated IVR session, and/or comprises terminating performance/execution of the iterative IVR navigation routine 711. For example, in some embodiments, if the IVR voice prompt for the current IVR navigation routine is predicted to indicate a human agent transition IVR voice prompt, then the automated IVR session (e.g., the call) is terminated.

In some embodiments, when the iterative IVR prompt class for a current IVR navigation routine iteration is an IVR re-initiation class, then the corresponding iterative IVR navigation operation comprises maintaining the corresponding automated IVR session and/or performing a subsequent IVR navigation routine iteration whose respective current IVR state node is the root IVR state node of the VR navigation tree data object associated with the automated IVR session. For example, in some embodiments, if the IVR voice prompt for the current IVR navigation routine cannot be mapped to any of the expected event/acoustic patterns of the downstream IVR state nodes of the current IVR state node and/or to the expected event/acoustic patterns of a human agent transition IVR voice prompt, then the automated IVR session may be moved back to the initial point of the navigation logic by causing transmission (e.g., by the voice engine 114) of a defined IVR re-initiation input (e.g., an input describing a keypad selection of a zero button or a pound button, for example to return to a "main menu") to the IVR system 103.

In some embodiments, when the iterative IVR prompt class for a current IVR navigation routine iteration is a transitional iterative IVR prompt class that is associated with a particular downstream IVR state node for a current IVR state node of the current IVR navigation routine iteration, if the downstream IVR node is a non-leaf IVR state node, then the corresponding iterative IVR navigation operation comprises maintaining the corresponding automated IVR session and/or performing a subsequent IVR navigation routine iteration whose respective current IVR state node is the particular downstream IVR state node. For example, during a current IVR navigation routine iteration whose current IVR state node is the root IVR state node 801 of the IVR navigation tree data object 800 that is depicted in FIG. 8, if the iterative IVR prompt class for the current IVR navigation routine iteration is a transitional iterative IVR prompt class that is associated with the downstream IVR state node 811, because the downstream IVR state node 811 is a non-leaf IVR state node, then the corresponding iterative IVR navigation operation for the noted current IVR navigation routine iteration may include performing a next IVR navigation routine iteration whose current IVR state node is the downstream IVR state node 811. This may lead, during the performance/execution of the next IVR navigation routine iteration, to providing the response data including expected data for the downstream IVR state node 811 (e.g., response data describing social security number of a target entity), as well as to determining an iterative IVR prompt class from a set of iterative IVR prompt classes that comprise a transitional iterative IVR prompt class for the downstream IVR state node 821 and the downstream IVR state node 822.

In some embodiments, when the iterative IVR prompt class for a current IVR navigation routine iteration is a transitional iterative IVR prompt class that is associated with a particular downstream IVR state node for a current IVR state node of the current IVR navigation routine iteration, if the downstream IVR node is a leaf IVR state node, then the corresponding iterative IVR navigation operation comprises terminating the corresponding iterative IVR navigation routine and causing the automated IVR interaction system to terminate the automated IVR session. In some embodiments, in the described scenario where the current IVR navigation routine iteration is associated with a transitional iterative IVR prompt class for a non-leaf IVR state node, response data corresponding to the noted leaf IVR state node is caused to be transmitted (e.g., by the voice engine 114) during the current IVR navigation routine iteration, as opposed to during any non-existent subsequent IVR navigation routine iterations. In some embodiments, in the described scenario where the current IVR navigation routine iteration is associated with a transitional iterative IVR prompt class for a non-leaf IVR state node, the IVR voice prompt received from the IVR system 103 during the current IVR navigation routine iteration (i.e., during the terminal IVR navigation routine iteration) is used to generate IVR interaction output data for the automated IVR interaction. The IVR interaction output data may, for example, describe information about whether a target entity has Medicare coverage.

For example, during a current IVR navigation routine iteration whose current IVR state node is the IVR state node

821 of the IVR navigation tree data object 800 that is depicted in FIG. 8, if the iterative IVR prompt class for the current IVR navigation routine iteration is a transitional iterative IVR prompt class that is associated with the downstream IVR state node 831, because the downstream IVR state node 831 is leaf IVR state node, then the corresponding iterative IVR navigation operation for the noted current IVR navigation routine iteration may include: (i) causing the voice engine 114 to provider zip code data for the target entity, (ii) recording the subsequent IVR voice prompt after providing the provider zip code, and (iii) determining an IVR interaction output (e.g., a COB determination and/or a Medicare coverage determination) based at least in part on the recorded IVR voice prompt.

At step/operation 707, during a current IVR navigation routine iteration, the IVR session management computing entity 106 determines whether an affirmative determination about terminating the iterative IVR navigation routine 711 during the current IVR navigation routine iteration has been reached. If so, the IVR session management computing entity 106 proceeds to step/operation 708 to perform one or more prediction-based actions based at least in part on an IVR interaction output determined during the IVR interaction session. However, if the IVR session management computing entity 106 determines that an affirmative determination about terminating the iterative IVR navigation routine 711 has not been reached (e.g., that a negative determination about terminating the iterative IVR navigation routine 711 has been reached), the IVR session management computing entity 106 performs a subsequent IVR navigation routine iteration via sequentially performing steps/operations 702-707.

The IVR interaction output may describe either that the automated IVR session was unsuccessful (e.g., if the automated IVR session ended at an iterative IVR prompt class associated with a non-leaf IVR state node), or that the automated IVR session was successful and the determination provided by the IVR system 103 based on the data/information provided during the successful automated IVR session (e.g., during the final IVR navigation routine iteration of the successful automated IVR session, during a portion of the final IVR navigation routine iteration of the successful automated IVR session that followed the last transmission of response data by the voice engine 114, and/or the like). In some embodiments, the IVR interaction outputs for a set of automated IVR sessions associated with a set of members are displayed using an IVR interaction output display user interface, such as the IVR interaction output display user interface 900 of FIG. 9.

In some embodiments, to perform the prediction-based actions, an IVR session management computing entity determines D investigation classifications for D target entities (e.g., members) based at least in part on the D hybrid reason code predictions for the D target entities. Then, the count of target entities that are associated with an affirmative investigation classification, along with a resource utilization ratio for each target entity, can be used to predict a predicted number of computing entities needed to perform post-prediction processing operations (e.g., automated investigation operations) with respect to the D target entities. For example, in some embodiments, the number of computing entities needed to perform post-prediction processing operations (e.g., automated investigation operations) with respect to D target entities can be determined based at least in part on the output of the equation: $R=\text{ceil}(\Sigma_k^{k=K} ur_k)$, where R is the predicted number of computing entities needed to perform post-prediction processing operations with respect to the D target entity, ceil(.) is a ceiling function that returns the closest integer that is greater than or equal to the value provided as the input parameter of the ceiling function, k is an index variable that iterates over K target entities that are associated with affirmative investigative classifications, and $ur_k$ is the estimated resource utilization ratio for a kth target entity that may be determined based at least in part on a count of data fields associated with the kth target entity. In some embodiments, once R is generated, a predictive data analysis computing entity can use R to perform operational load balancing for a server system that is configured to perform post-prediction processing operations (e.g., automated investigation operations) with respect to the D target entities. This may be done by allocating computing entities to the post-prediction processing operations if the number of currently-allocated computing entities is below R, and deallocating currently-allocated computing entities if the number of currently-allocated computing entities is above R.

Accordingly, as described above, various embodiments of the present invention are configured to address technical challenges associated with efficiently and effectively facilitating real-time automated interactions with an IVR system by using voice prompt classification machine learning frameworks and IVR navigation tree data objects. As described below, by utilizing the noted techniques, various embodiment of the present invention reduce the number of predictive inferences that need to be performed during each current IVR navigation routine to O(n) predictive inferences, where n is the number of downstream IVR state nodes of a current IVR state node that is associated with the current IVR navigation routine. For example, in some embodiments, n+2 predictive inferences will be performed, where n is the number of downstream IVR state nodes of a current IVR state node that is associated with the current IVR navigation routine, and where n predictive inferences are performed to determine classification scores for the n downstream IVR state nodes, one predictive inference is performed to determine whether to terminate the automated IVR session in response to a human agent transition IVR voice prompt, and one predictive inference is performed to determine whether to return to a root IVR state node if the preceding predictive inferences are not deemed sufficiently reliable. Accordingly, by reducing the number of predictive inferences that need to be performed during each current IVR navigation routine to O(n) predictive inferences, where n is the number of downstream IVR state nodes of a current IVR state node that is associated with the current IVR navigation routine, various embodiments of the present invention reduce the number of computational operations that need to be performed to efficiently and effectively facilitate real-time automated interactions with an IVR system. In doing so, various embodiments of the present invention improve computational efficiency of real-time automated IVR interaction solutions.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although, specific terms are employed herein, they are used in a generic and descriptive sense only and not for purposes of limitation.

The invention claimed is:

1. A computer-implemented method comprising:
receiving, by one or more processors and at an interactive voice response (IVR) session management computing entity, a session request for establishing an automated IVR session between an IVR system and an automated IVR interaction system, wherein:
(i) the session request comprises a resource utilization category of a plurality of resource utilization categories, and
(ii) the resource utilization category is associated with a minimum resource utilization share used to determine a required share of computing resource units for the session request;
determining, by the one or more processors, a session position for the session request in an automated IVR session queue for the resource utilization category;
responsive to the automated IVR session queue reaching the session position for the session request, identifying, by the one or more processors, an IVR navigation tree data object associated with the automated IVR session, wherein the IVR navigation tree data object defines (i) a plurality of IVR state nodes comprising one or more non-leaf IVR state nodes and a plurality of leaf IVR state nodes, and (ii) for a non-leaf IVR state node of the one or more non-leaf IVR state nodes, a downstream state subset comprising a group of the plurality of leaf IVR state nodes that comprises one or more downstream IVR state nodes for the non-leaf IVR state node; and
performing, by the one or more processors, one or more IVR navigation routine iterations of an iterative IVR navigation routine associated with the session request by traversing the IVR navigation tree data object.

2. The computer-implemented method of claim 1, wherein traversing the IVR navigation tree data object comprises:
at an iteration of the one or more IVR navigation routine iterations, determining, using a voice prompt classification machine learning framework and based at least in part on a current IVR voice prompt for the iteration, that an iterative IVR prompt class from a plurality of candidate iterative IVR prompt classes is an IVR interaction termination class, wherein the plurality of candidate iterative IVR prompt classes comprise the IVR interaction termination class and a plurality of transitional iterative IVR prompt classes.

3. The computer-implemented method of claim 2, wherein the plurality of candidate iterative IVR prompt classes further comprise an IVR re-initiation class.

4. The computer-implemented method of claim 3, further comprising:
performing an iterative IVR navigation operation based at least in part on the iterative IVR prompt class by;
determining that the iterative IVR prompt class is the IVR re-initiation class;
in response to determining that the iterative IVR prompt class is the IVR re-initiation class, causing the automated IVR interaction system to transmit an IVR re-initiation input to the IVR system; and
performing a subsequent IVR navigation routine iteration that is associated with a root IVR state node.

5. The computer-implemented method of claim 4, wherein performing the iterative IVR navigation operation comprises:
determining that the iterative IVR prompt class is a transitional iterative IVR prompt class of the plurality of transitional iterative IVR prompt classes that is associated with a non-leaf state node of the one or more downstream IVR state nodes; and
in response to determining that the iterative IVR prompt class is the transitional iterative IVR prompt class of the plurality of transitional iterative IVR prompt classes that is associated with the non-leaf state node of the one or more downstream IVR state nodes, performing a subsequent IVR navigation routine iteration that is associated with the non-leaf state node.

6. The computer-implemented method of claim 4, wherein performing the iterative IVR navigation operation comprises:
determining that the iterative IVR prompt class is a transitional iterative IVR prompt class of the plurality of transitional iterative IVR prompt classes that is associated with a leaf state node of the one or more downstream IVR state nodes; and
in response to determining that the iterative IVR prompt class is the transitional iterative IVR prompt class of the plurality of transitional iterative IVR prompt classes that is associated with the leaf state node of the one or more downstream IVR state node, terminating the iterative IVR navigation routine and causing the automated IVR interaction system to terminate the automated IVR session.

7. The computer-implemented method of claim 2, wherein the automated IVR session is established in response to determining the affirmative resource allocation determination for the automated IVR session.

8. The computer-implemented method of claim 7, wherein the affirmative resource allocation determination for the automated IVR session is determined based at least in part on: (i) the session position and (ii) the minimum resource utilization share for the resource allocation utilization category.

9. The computer-implemented method of claim 2, wherein traversing the IVR navigation tree data object further comprises, in response to determining that the iterative IVR prompt class is the IVR interaction termination class, terminating the iterative IVR navigation routine and causing the automated IVR interaction system to terminate the automated IVR session.

10. The computer-implemented method of claim 9, wherein the voice prompt classification machine learning framework is trained using a training entry that associates a human agent transition IVR voice prompt with a ground-truth label that describes the IVR interaction termination class.

11. The computer-implemented method of claim 1, wherein the session position is determined based at least in part on a receipt timestamp of the session request and a workflow priority score for a triggering workflow associated with the automated IVR session.

12. A system comprising memory and one or more processors communicatively coupled to the memory, the one or more processors configured to:
receive, at an interactive voice response (IVR) session management computing entity, a session request for establishing an automated IVR session between an IVR system and an automated IVR interaction system, wherein:

(i) the session request comprises a resource utilization category of a plurality of resource utilization categories, and (ii) the resource utilization category is associated with a minimum resource utilization share used to determine a required share of computing resource units for the session request;

determine a session position for the session request in an automated IVR session queue for the resource utilization category;

responsive to the automated IVR session queue reaching the session position for the session request, identify an IVR navigation tree data object associated with the automated IVR session, wherein the IVR navigation tree data object defines (i) a plurality of IVR state nodes comprising one or more non-leaf IVR state nodes and a plurality of leaf IVR state nodes, and (ii) for a non-leaf IVR state node of the one or more non-leaf IVR state nodes, a downstream state subset comprising a group of the plurality of leaf IVR state nodes that comprises one or more downstream IVR state nodes for the non-leaf IVR state node; and perform one or more IVR navigation routine iterations of an iterative IVR navigation routine associated with the session request by traversing the IVR navigation tree data object.

13. The system of claim 12, wherein to traverse the IVR navigation tree data object, the one or more processors are further configured to:

at an iteration of the one or more IVR navigation routine iterations, determine, using a voice prompt classification machine learning framework and based at least in part on a current IVR voice prompt for the iteration, that an iterative IVR prompt class from a plurality of candidate iterative IVR prompt classes is an IVR interaction termination class, wherein the plurality of candidate iterative IVR prompt classes comprise the IVR interaction termination class and a plurality of transitional iterative IVR prompt classes.

14. The system of claim 13, wherein to traverse the IVR navigation tree data object, the one or more processors are further configured to, in response to the determination that the iterative IVR prompt class is the IVR interaction termination class, terminate the iterative IVR navigation routine and cause the automated IVR interaction system to terminate the automated IVR session.

15. The system of claim 14, wherein the voice prompt classification machine learning framework is trained using a training entry that associates a human agent transition IVR voice prompt with a ground-truth label that describes the IVR interaction termination class.

16. The system of claim 13, wherein the plurality of candidate iterative IVR prompt classes further comprise an IVR re-initiation class.

17. The system of claim 16, wherein the one or more processors are further configured to:

perform an iterative IVR navigation operation based at least in part on the iterative IVR prompt class by;

determine that the iterative IVR prompt class is the IVR re-initiation class;

in response to the determination that the iterative IVR prompt class is the IVR re-initiation class, cause the automated IVR interaction system to transmit an IVR re-initiation input to the IVR system; and perform a subsequent IVR navigation routine iteration that is associated with a root IVR state node.

18. The system of claim 17, wherein to perform the iterative IVR navigation operation for the current IVR navigation routine iteration, the one or more processors are configured to:

determine that the iterative IVR prompt class is a transitional iterative IVR prompt class of the plurality of transitional iterative IVR prompt classes that is associated with a non-leaf state node of the one or more downstream IVR state nodes; and in response to the determination that the iterative IVR prompt class is the transitional iterative IVR prompt class of the plurality of transitional iterative IVR prompt classes that is associated with the non-leaf state node of the one or more downstream IVR state nodes, perform a subsequent IVR navigation routine iteration that is associated with the non-leaf state node.

19. The system of claim 17, wherein to perform the iterative IVR navigation operation for the current IVR navigation routine iteration, the one or more processors are further configured to:

determine that the iterative IVR prompt class is a transitional iterative IVR prompt class of the plurality of transitional iterative IVR prompt classes that is associated with a leaf state node of the one or more downstream IVR state nodes; and in response to the determination that the iterative IVR prompt class is the transitional iterative IVR prompt class of the plurality of transitional iterative IVR prompt classes that is associated with the leaf state node of the one or more downstream IVR state nodes, terminate the iterative IVR navigation routine and cause the automated IVR interaction system to terminate the automated IVR session.

20. One or more non-transitory computer-readable storage media including instructions that, when executed by one or more processors, cause the one or more processors to:

receive, at an interactive voice response (IVR) session management computing entity, a session request for establishing an automated IVR session between an IVR system and an automated IVR interaction system, wherein:

(i) the session request comprises a resource utilization category of a plurality of resource utilization categories, and (ii) the resource utilization category is associated with a minimum resource utilization share used to determine a required share of computing resource units for the session request;

determine a session position for the session request in an automated IVR session queue for the resource utilization category;

responsive to the automated IVR session queue reaching the session position for the session request, identify an IVR navigation tree data object associated with the automated IVR session, wherein the IVR navigation tree data object defines (i) a plurality of IVR state nodes comprising one or more non-leaf IVR state nodes and a plurality of leaf IVR state nodes, and (ii) for a non-leaf IVR state node of the one or more non-leaf IVR state nodes, a downstream state subset comprising a group of the plurality of leaf IVR state nodes that comprises one or more downstream IVR state nodes for the non-leaf IVR state node; and perform one or more IVR navigation routine iterations of an iterative IVR navigation routine associated with the session request by traversing the IVR navigation tree data object.

* * * * *